United States Patent
Cho et al.

(10) Patent No.: US 8,072,947 B2
(45) Date of Patent: Dec. 6, 2011

(54) METHOD AND APPARATUS FOR DISTRIBUTING MOBILE STATION INFORMATION IN WIRELESS MESH NETWORK

(75) Inventors: Song-yean Cho, Seoul (KR); Min-soo Kim, Seoul (KR); Jl-young Kong, Seoul (KR); Hyeong-seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1324 days.

(21) Appl. No.: 11/410,056

(22) Filed: Apr. 25, 2006

(65) Prior Publication Data

US 2006/0262762 A1    Nov. 23, 2006

(30) Foreign Application Priority Data

Apr. 25, 2005 (KR) .................. 10-2005-0034160

(51) Int. Cl.
*H04W 4/00* (2009.01)
(52) U.S. Cl. ........... 370/338; 370/328; 370/315; 455/7; 455/414.1; 455/552.1; 455/41.2
(58) Field of Classification Search .......... 370/338, 370/328, 315; 455/7, 414.1, 552.1, 41.2
See application file for complete search history.

(56) References Cited

U.S. PATENT DOCUMENTS

| | | | |
|---|---|---|---|
| 5,559,804 A * | 9/1996 | Amada et al. | 370/347 |
| 5,982,762 A * | 11/1999 | Anzai et al. | 370/338 |
| 6,728,550 B1 * | 4/2004 | Bohnke et al. | 455/522 |
| 7,152,110 B2 * | 12/2006 | Pierce | 709/227 |
| 7,630,311 B2 * | 12/2009 | Jung et al. | 370/235 |
| 2003/0076837 A1 | 4/2003 | Whitehill et al. | |
| 2003/0157895 A1 | 8/2003 | Agrawal et al. | |
| 2003/0202505 A1 | 10/2003 | Ozugur | |
| 2003/0207697 A1 | 11/2003 | Shpak | |
| 2004/0105449 A1 | 6/2004 | Jung et al. | |
| 2006/0140147 A1 * | 6/2006 | Van Bemmel | 370/329 |
| 2006/0239223 A1 * | 10/2006 | Sherman et al. | 370/329 |
| 2006/0262753 A1 * | 11/2006 | Cho et al. | 370/331 |

FOREIGN PATENT DOCUMENTS

| | | |
|---|---|---|
| JP | 08-097821 | 4/1996 |
| JP | 08-265358 | 10/1996 |
| JP | 2004-080130 A | 3/2004 |
| JP | 2004-180121 | 6/2004 |
| JP | 2006-304301 | 11/2006 |

OTHER PUBLICATIONS

European Search Report issued in European Application No. 06112993.8 on Aug. 16, 2006.

(Continued)

*Primary Examiner* — Nghi Ly
(74) *Attorney, Agent, or Firm* — NSIP Law

(57) ABSTRACT

A mechanism for establishing a wireless communication environment in which a wireless mesh network and a wireless local area network (LAN) are structured in a single plane and communicate with each other. A method of providing mobile station information includes obtaining information of at least one mobile station located in a wireless LAN from among a plurality of wireless LANs using a first frame received through the wireless LAN and transmitting a second frame including the obtained information over a network of mobile nodes including a mobile node that coordinates the wireless LAN.

26 Claims, 15 Drawing Sheets

OTHER PUBLICATIONS

Yasunori Owada et al. "A Study on Protocol, Implementation and Throughput Evaluation for Multihop Wireless LAN." IEEE Vehicular Technology Conference, Apr. 22, 2003, vol. 3 of 4, pp. 1773-1777.
Owada et al., "A Study on Protocol, Implementation and Throughput Evaluation for Multihop Wireless LAN", *IEEE,* Dec. 31, 2003.
First Office Action issued Dec. 7, 2007 by the State Intellectual Property Office of the People's Republic of China re: Chinese Application No. 2006100749824.
Japanese Office Action issued on Jan. 4, 2011, in corresponding Japanese Patent Application No. 2006-119793 (4 pages).
Chinese Office Action issued on Jun. 16, 2011, in corresponding Chinese Patent Application No. 200610074982.4 (25 pages).
Notice of Reason for Rejection issued by the Japanese Patent Office on Jun. 21, 2011, in corresponding Japanese Patent Application No. 2006-119793.

* cited by examiner

⊙ 802.11 STATION
○ WIRELESS MESH POINT
☐ WIRELESS MESH AP
▨ MESH PORTAL

METHOD AND APPARATUS FOR DISTRIBUTING MOBILE STATION INFORMATION IN WIRELESS MESH NETWORK

CROSS-REFERENCE TO RELATED APPLICATION

This application claims the benefit of Korean Patent Application No. 2005-34160, filed on Apr. 25, 2005 in the Korean Intellectual Property Office, the disclosure of which is incorporated herein in its entirety by reference.

BACKGROUND OF THE INVENTION

1. Field of the Invention

An aspect of the present invention relates to a mechanism for establishing a wireless communication environment in which a wireless mesh network and a wireless local area network (LAN) are structured in a single plane.

2. Description of the Related Art

FIG. 1 illustrates a conventional wireless communication environment.

Referring to FIG. 1, the conventional wireless communication environment includes a wireless mesh network 1 and a wireless local area network (LAN) 2.

The wireless mesh network 1 includes mobile nodes, which are referred to as wireless mesh points or, in short, as mesh points. These mesh points are connected wirelessly to communicate with one another. The wireless LAN 2 includes mobile stations that form basic service sets (BSSs).

According to the IEEE 802.11 wireless LAN standard, a BSS refers to a set of mobile stations in an area where they can communicate with one another. Due to the uncertainty of transmission distances of signals output from mobile stations, a BSS does not indicate a specific area. In addition, a set of BSSs is referred to as an extended service set (ESS).

According to the IEEE 802.11 wireless LAN standard, a static node for coordinating a BSS is called an access point (AP). When an AP receives a wireless LAN frame from a mobile station located in a BSS coordinated by the AP, the AP transmits the received wireless LAN frame to a destination mobile station if the destination mobile station is located in the BSS coordinated by the AP. However, if the destination mobile station is located in another BSS that is not coordinated by the AP, the AP transmits the received wireless LAN frame to another AP so that the received wireless LAN frame arrives at the destination mobile station. To this end, APs are connected in a wired manner.

However, the conventional wireless communication environment illustrated in FIG. 1 in which the wireless mesh network 1 and the wireless LAN 2 are structured in different planes does not constitute a wireless communication environment in which the wireless mesh network 1 and the wireless LAN 2 are structured in a single plane and communicate with each other. As a result, the conventional wireless communication environment illustrated in FIG. 1 does not provide a mechanism for establishing a wireless communication environment in which a wireless mesh network 1 and the wireless LAN 2 are structured in a single plane and communicate with each other.

SUMMARY OF THE INVENTION

An aspect of the present invention provides a method and apparatus for providing a mechanism for establishing a wireless communication environment in which a wireless mesh network and a wireless LAN are structured in a single plane and communicate with each other.

Another aspect of the present invention provides a computer-readable recording medium having recorded thereon a program for implementing the methods for establishing a wireless communication environment in which a wireless mesh network and a wireless LAN are structured in a single plane and communicate with each other.

According to one aspect of the present invention, there is provided a method of providing mobile station information. The method includes obtaining information about at least one mobile station located in a wireless local area network (LAN) from among a plurality of wireless LANs using a first frame received through the wireless LAN and transmitting a second frame including the obtained information over a network of mobile nodes including a mobile node that coordinates the wireless LAN.

According to another aspect of the present invention, there is provided an apparatus for providing mobile station information. The apparatus includes a first frame processing unit that obtains information about at least one mobile station located in a wireless local area network (LAN) from among a plurality of wireless LANs using a first frame received through the wireless LAN and a second frame transmitting unit that transmits a second frame including the obtained information over a network of mobile nodes including a mobile node that coordinates the wireless LAN.

According to still another aspect of the present invention, there is provided a computer-readable recording medium having recorded thereon a program for implementing a method of providing mobile station information. The method includes obtaining information about at least one mobile station located in a wireless local area network (LAN) from among a plurality of wireless LANs using a first frame received through the wireless LAN and transmitting a second frame including the obtained information over a network of mobile nodes including a mobile node that coordinates the wireless LAN.

According to yet another aspect of the present invention, there is provided a method of obtaining mobile station information. The method includes receiving a frame over a network of mobile nodes and obtaining information about at least one mobile station located in a wireless local area network (LAN) coordinated by one of the mobile nodes using the received frame.

According to yet another aspect of the present invention, there is provided an apparatus for obtaining mobile station information. The apparatus includes a frame receiving unit that receives a frame over a network of mobile nodes and a frame processing unit that obtains information about at least one mobile station located in a wireless local area network (LAN) coordinated by one of the mobile nodes using the frame received via the frame receiving unit.

According to yet another aspect of the present invention, there is provided a computer-readable recording medium having recorded thereon a program for implementing a method of obtaining mobile station information. The method includes receiving a frame over a network of mobile nodes and obtaining information about at least one mobile station located in a wireless local area network (LAN) coordinated by one of the mobile nodes using the received frame.

According to yet another aspect of the present invention, there is provided a method of relaying mobile station information. The method includes obtaining information about at least one mobile station located in a wireless local area network (LAN) coordinated by one of a plurality of mobile nodes using a first frame received over a network of the mobile nodes and transmitting a second frame including the obtained information over the network of the mobile nodes.

According to yet another aspect of the present invention, there is provided an apparatus for relaying mobile station information. The apparatus includes a first frame processing unit that obtains information about at least one mobile station located in a wireless local area network (LAN) coordinated by one of a plurality of mobile nodes using a first frame received over a network of the mobile nodes and a second frame transmitting unit that transmits a second frame including the obtained information over the network of the mobile nodes.

According to yet another aspect of the present invention, there is provided a computer-readable recording medium having recorded thereon a program for implementing a method of relaying mobile station information. The method includes obtaining information about at least one mobile station located in a wireless local area network (LAN) coordinated by one of a plurality of mobile nodes using a first frame received over a network of the mobile nodes and transmitting a second frame including the obtained information over the network of the mobile nodes.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
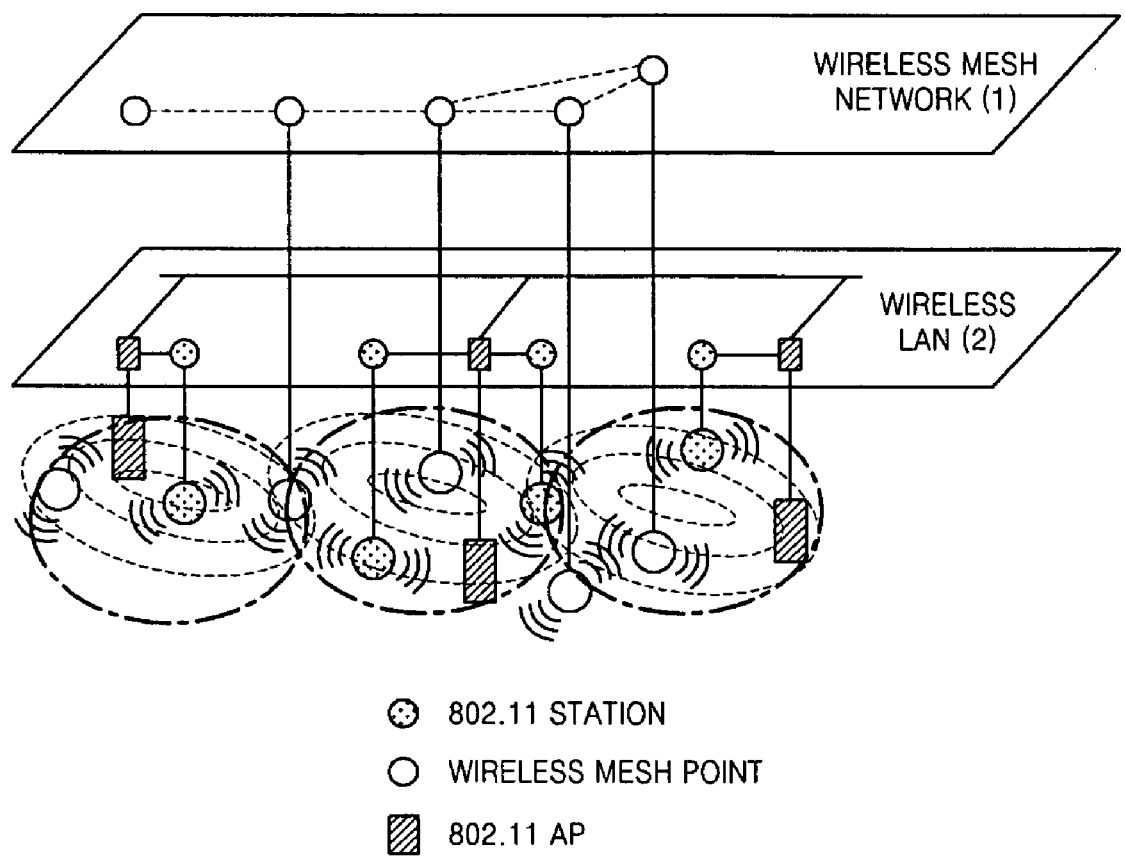
FIG. 1 illustrates a conventional wireless communication environment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
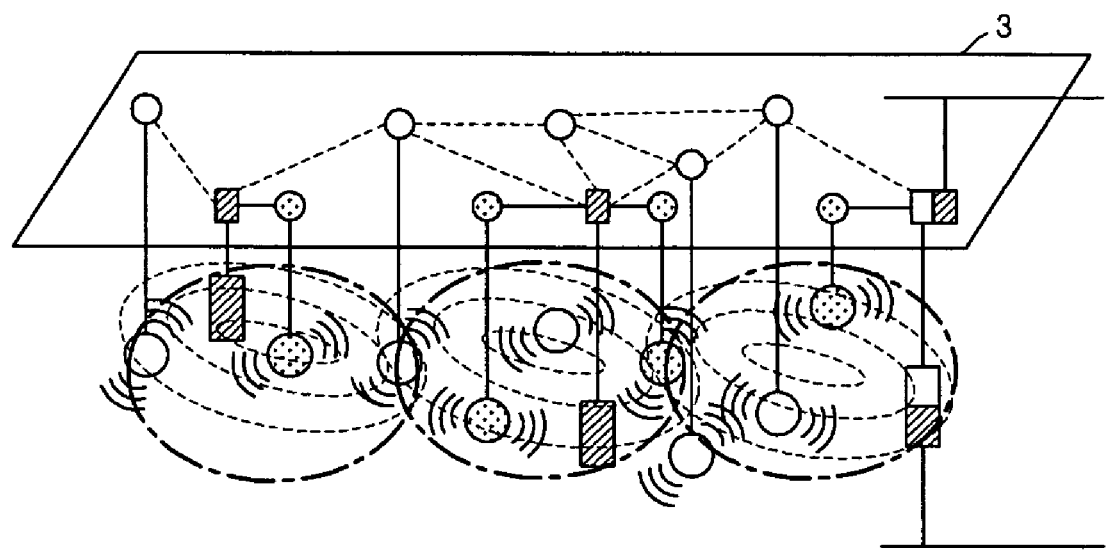
FIG. 2 illustrates a wireless communication environment according to an embodiment of the present invention.

FIG. 2 illustrates a wireless communication environment according to an embodiment of the present invention.

Referring to FIG. 2, the wireless communication environment includes a wireless mesh network and a wireless local area network (LAN) that are structured in a single plane 3.

According to the current embodiment of the present invention, an access point (AP), acting as a mobile node, coordinates a basic service set (BSS) and serves as a node in the wireless mesh network. Such an AP is referred to as a wireless mesh AP or in short, as a mesh AP. On the other hand, a wireless mesh point only serves as a node in the wireless mesh network.

To establish a wireless communication environment in which a wireless mesh network and a wireless LAN are structured in a single plane and communicate with each other, wireless mesh points and wireless mesh APs should be capable of transmitting data received from a mobile station in a BSS to a mobile station in another BSS. To this end, a mechanism for distributing information about mobile stations (mobile station information) located in a plurality of BSSs to the wireless mesh points and the wireless mesh APs is required. Hereinafter, the wireless mesh points and the wireless mesh APs will be referred to as mobile nodes.

Figure 3:
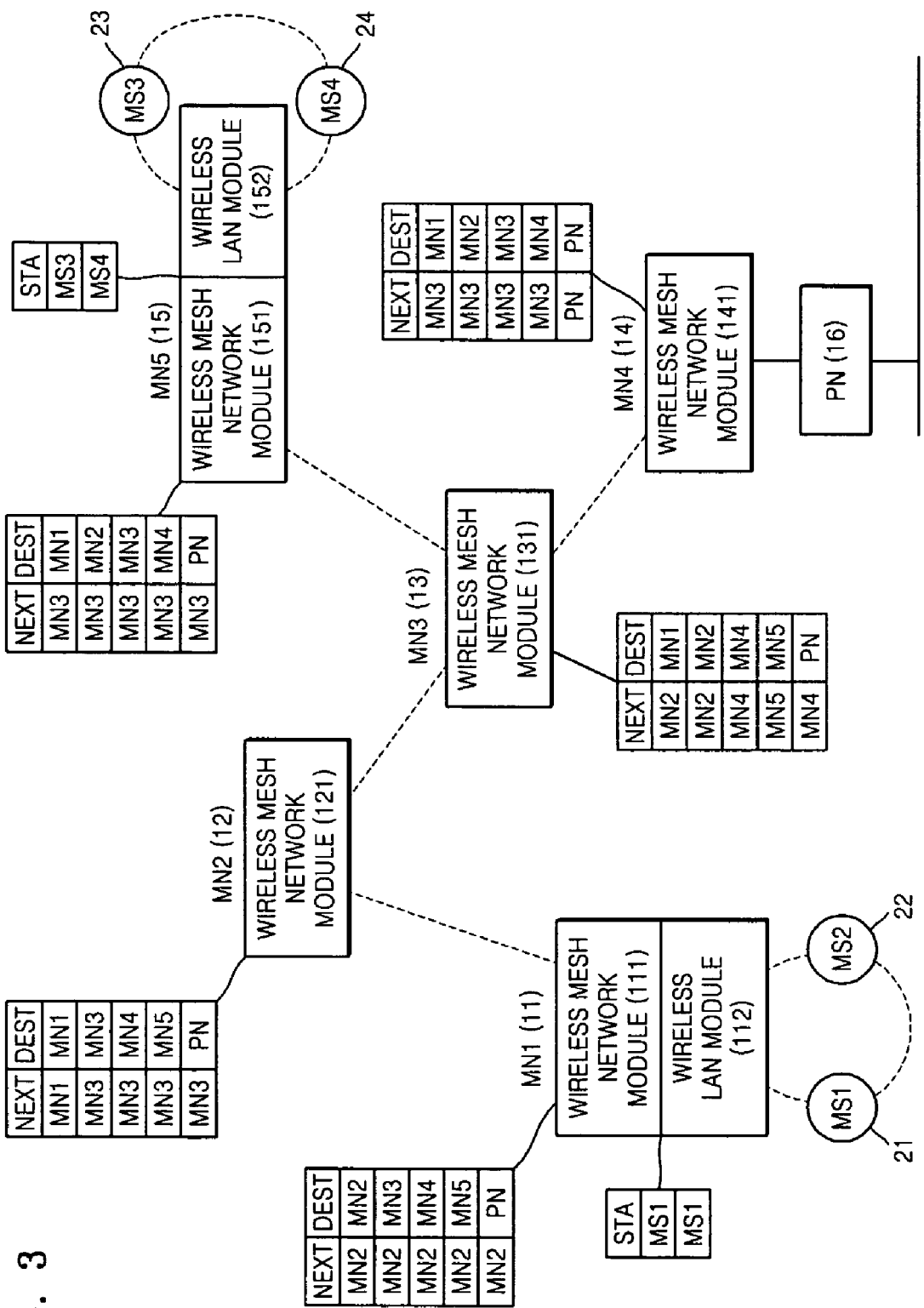
FIG. 3 illustrates a detailed structure of the wireless communication environment of FIG. 2 according to an embodiment of the present invention.

FIG. 3 illustrates a detailed structure of the wireless communication environment of FIG. 2 according to an embodiment of the present invention.

Referring to FIG. 3, the wireless communication environment according to the current embodiment of the present invention includes mobile nodes (MNs) 11 through 15 (MN1 through MN5) and mobile stations (MSs) 21 through 24 (MS1 through MS4). A static node PN 16, acting as a portal node (PN), is connected to a network using a heterogeneous protocol in a wired manner.

The MNs 11 through 15 are connected to one another to form a wireless mesh network. The MSs 21 and 22 are connected to the MN1 11 to form a BSS, and the MSs 23 and 24 are connected to the MN5 15 to form another BSS.

In particular, a mobile node coordinates each BSS and a mobile station can communicate with other mobile stations within each BSS by the mobile node relay. On the other hand, since mobile nodes of a wireless mesh network are connected with one another by a wireless multi-hop and thus can directly communicate with one another, the wireless mesh network can be self-organized by the mobile nodes without the relay of one of the mobile nodes.

Some of the mobile nodes of the wireless mesh network, e.g., the MNs 12 through 14, serve as nodes of the wireless mesh network, and some, e.g., the MNs 11 and 15, serve as both nodes of the wireless mesh network and APs that coordinates their BSSs.

The MNs 12 through 14 that serve only as nodes in the wireless mesh network include only wireless mesh network modules 121, 131, and 141, respectively. On the other hand, the MNs 11 and 15 that serve as both nodes in the wireless mesh network and APs that coordinate their BSSs include wireless mesh network modules 111 and 151 and wireless LAN modules 112 and 152, respectively.

Each of the wireless mesh network modules 111 through 151 has a forwarding table to transmit a wireless mesh network frame received over a wireless mesh network to a mobile node corresponding to a next hop. The forwarding table stores the media access control (MAC) address of a destination mobile node and the MAC address of a mobile node corresponding to a next hop determined according to a routing protocol.

The wireless LAN modules 112 and 152 are completely compatible with the IEEE 802.11 wireless LAN standard. In other words, the wireless LAN modules 112 and 152 authenticate the MSs 21 and 22 and associate with the MSs 21 and 22 according to the IEEE 802.11 wireless LAN standard. The wireless LAN modules 112 and 152 obtain the MAC addresses of the MSs 21 and 22 from a wireless LAN frame related to the authentication and association and store the obtained MAC addresses in their BSS station tables. Thereafter, the MNs 11 and 15 transmit a wireless LAN frame received from a mobile station in their BSSs to a mobile station located in another BSS by referring to the BSS station tables.

Figure 4:
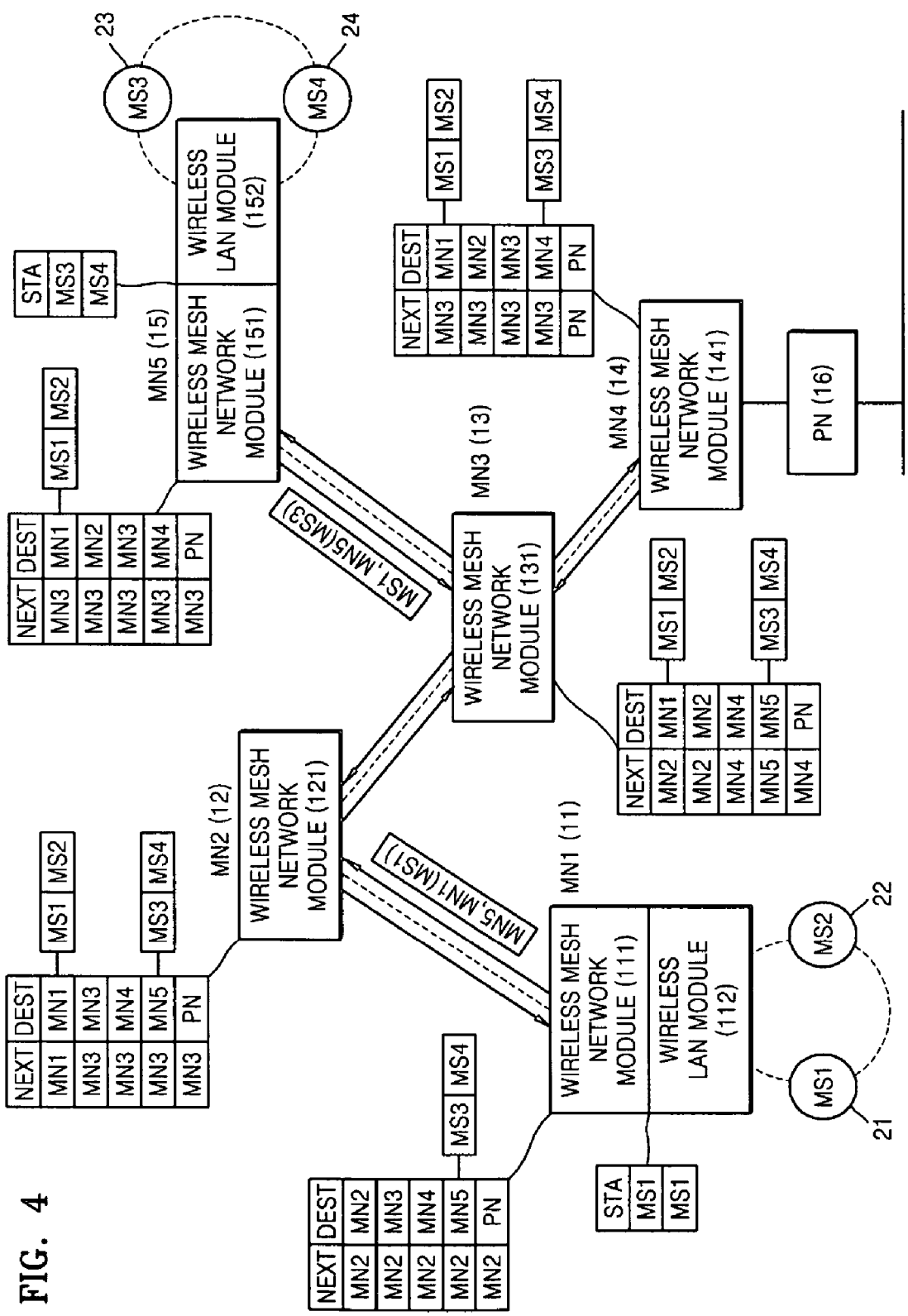
FIG. 4 illustrates a view for explaining a method of distributing mobile station information in the wireless communication environment of FIG. 3 according to an embodiment of the present invention.

FIG. 4 is a view for explaining a method of distributing mobile station information in the wireless communication environment of FIG. 3 according to an embodiment of the present invention.

Referring to FIG. 4, the MN1 11 broadcasts a wireless mesh network frame including its MAC address and the MAC addresses of the MSs 21 and 22 (MS1 and MS2) located in its coordinated BSS. Similarly, the MN 5 15 broadcasts a wireless mesh network frame including its MAC address and the MAC addresses of the MSs 23 and 24 located in its coordinated BSS. Thus, the MNs 11 and 15 in the wireless mesh network can receive the wireless mesh network frames.

The other MNs 12 through 14 that receive the broadcasted wireless mesh network frames can determine which mobile station is located in a BSS and which mobile node coordinates the BSS based on the received wireless mesh network frames. The mobile nodes map the MAC addresses of the mobile stations to the MAC addresses of the mobile nodes in the forwarding tables and store the mapped MAC addresses, and thus, a wireless communication environment in which the wireless mesh network and the wireless LAN are structured in a single plane and communicate with each other can be established.

However, since all the mobile nodes that coordinate their BSSs broadcast information about mobile stations located in their BSSs according to the method of FIG. 4, the method of FIG. 4 is suitable for a wireless communication environment in which paths to all the mobile stations are ensured. In general, such a wireless communication environment has short traffic survival time and dispersed traffic, which means that the amount of data exchanged between mobile stations is small and most of the mobile stations participate in communication.

Figure 5:
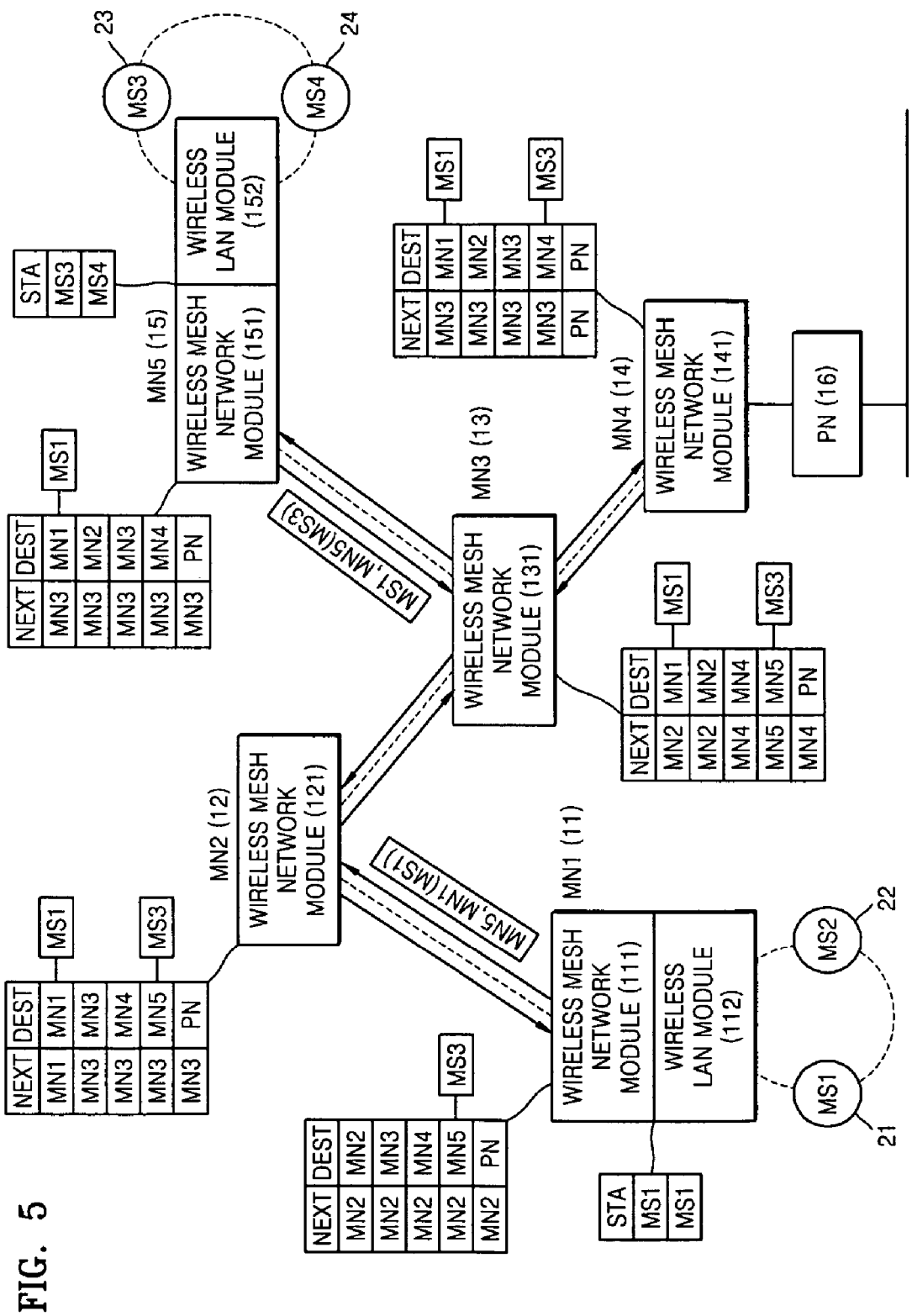
FIG. 5 illustrates a view for explaining a method of distributing mobile station information in the wireless communication environment of FIG. 3 according to another embodiment of the present invention.

FIG. 5 is a view for explaining a method of distributing mobile station information in the wireless communication environment of FIG. 3 according to another embodiment of the present invention.

Referring to FIG. 5, the MN5 15 receives a wireless LAN frame from the MS3 23 and attempts to obtain information about a destination, i.e., the MS1 21, in order to transmit the received wireless LAN frame to the MS1 21. If the MN5 15 fails to obtain the information, it broadcasts a wireless mesh network frame including the MAC address of the destination MS1 21, its MAC address, and the MAC address of the MS3 23 located in its coordinated BSS.

The wireless mesh network frame requests the MAC address of a mobile node that coordinates a BSS in which the destination MS1 21 is located. In response to the wireless mesh network frame, the MN1 11 that receives the wireless mesh network frame unicasts a wireless mesh network frame including the MAC address of a destination, i.e., the MN5 15, its MAC address, and the MAC address of the MS1 21 located in its coordinated BSS.

However, unlike in the method of FIG. 4, in the method of FIG. 5, a mobile node distributes information about only a mobile station that actually participates in communication, instead of distributing information about all the mobile stations located in its coordinated BSS. A request for mobile station information is broadcasted because the MAC address of a destination mobile node is unknown, but a response to the request is unicasted. Mobile nodes located on transmission paths of the wireless mesh network frames can receive the wireless mesh network frames and obtain mobile station information included in the received wireless mesh network frames to avoid a waste of wireless network resources.

In other words, the method of FIG. 5 is suitable for a wireless communication environment in which it is more efficient to ensure a path only for a mobile station that actually participates in communication. In general, such a wireless communication environment has long traffic survival time and concentrated traffic, which means that the amount of data exchanged between mobile stations is large and a few of the mobile stations participate in communication according to an embodiment of the present invention.

Figure 6:
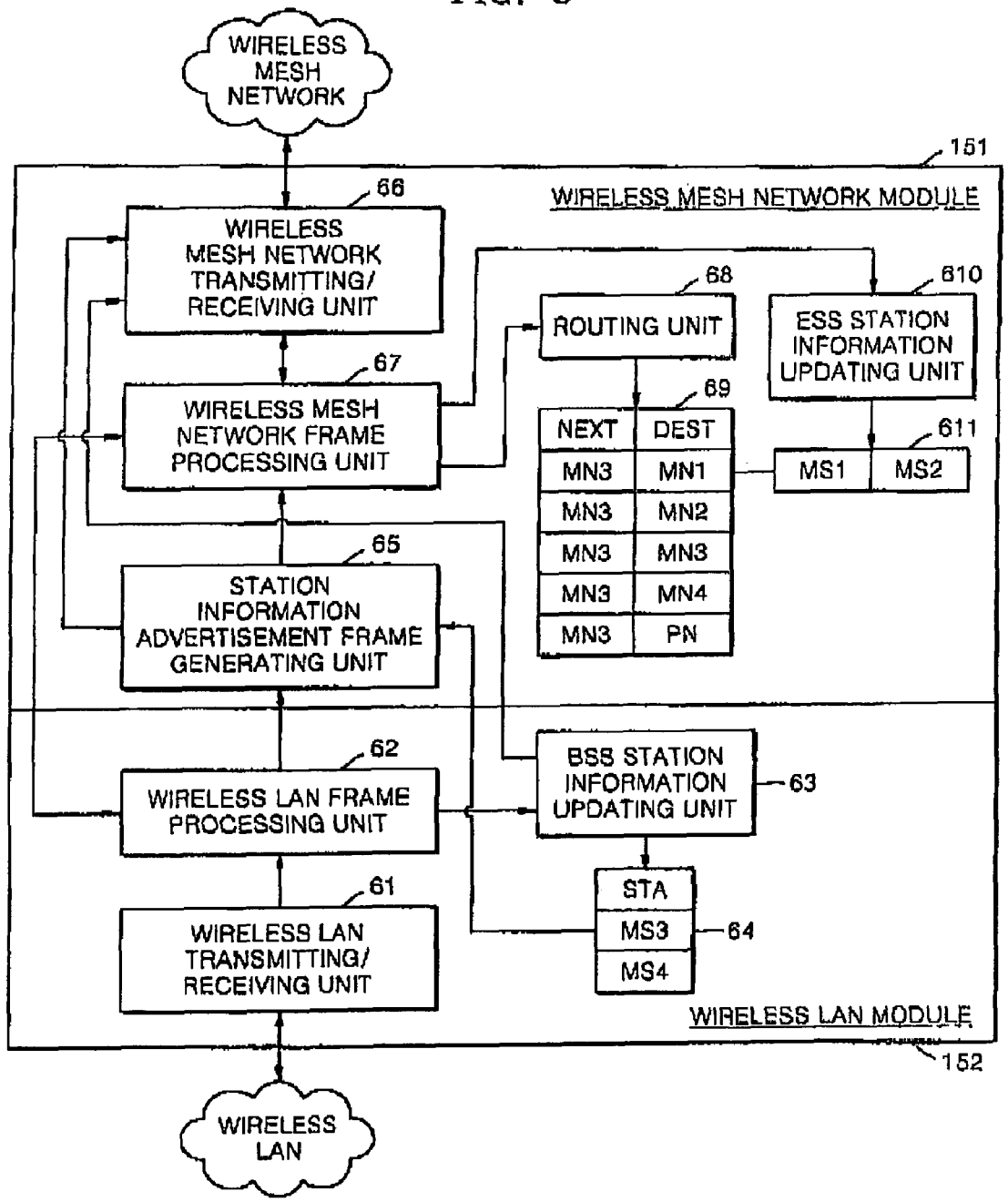
FIG. 6 is a block diagram of a mobile node illustrated in FIG. 4 according to an embodiment of the present invention.

FIG. 6 is a block diagram of the MN5 15 illustrated in FIG. 4. Referring to FIG. 6, the MN5 15 includes the wireless mesh network module 151 and the wireless LAN module 152 and has a function of providing mobile station information to other mobile nodes over the wireless mesh network and a function of obtaining the mobile station information from the other mobile nodes. However, it can be understood by those skilled in the art that the MN5 15 may include other components in addition to those illustrated in FIG. 6 to support other functions.

Referring to FIG. 6, the wireless LAN module 152 of the MN5 15 illustrated in FIG. 4 includes a wireless LAN transmitting/receiving unit 61, a wireless LAN frame processing unit 62, a BSS station information updating unit 63, and a BSS station table 64.

The wireless LAN transmitting/receiving unit 61 transmits and receives a wireless LAN frame through a BSS coordinated by the MN5 15.

The wireless LAN frame processing unit 62 analyzes the wireless LAN frame received via the wireless LAN transmitting/receiving unit 61 and processes the wireless LAN frame based on the analysis result. More specifically, the wireless LAN frame processing unit 62 analyzes the wireless LAN frame to determine if the wireless LAN frame received through the BSS coordinated by the MN5 15 is related to authentication and association with respect to the BSS.

The wireless LAN frame processing unit 62 obtains information about the MSs 23 and 24 located in the BSS coordinated by the MN5 15 if the wireless LAN frame received through the BSS is related to authentication and association with respect to the BSS. The information about the MSs 23 and 24 includes the MAC addresses of the MSs 23 and 24 and the MAC address of the MN5 15 to indicate that the MSs 23 and 24 are located in the BSS coordinated by the MN5 15. The MAC addresses of the MSs 23 and 24 are included in the wireless LAN frame received through the BSS and the MAC address of the MN5 15 is recorded in a wireless LAN card installed in the MN5 15.

The wireless LAN frame processing unit 62 processes the wireless LAN frame according to a policy prescribed for the wireless LAN frame if the wireless LAN frame received through the BSS is related to authentication and association with respect to the BSS. For example, if the wireless LAN frame received through the BSS includes data to be transmitted to a mobile station located in another BSS, the wireless LAN frame processing unit 62 outputs the wireless LAN frame to the wireless mesh network module 151 so that the data arrives at the mobile station in another BSS over the wireless mesh network.

The BSS station information updating unit 63 updates the MAC addresses of mobile stations stored in the BSS station table 64 using the information obtained by the wireless LAN frame processing unit 62. For example, when the MSs 23 and 24 enter the BSS coordinated by the MN5 15 for the first time, the MSs 23 and 24 transmit wireless LAN frames related to authentication and association with respect to the BSS to the MN5 15, and the MN5 15 obtains the MAC addresses of the MSs 23 and 24 from the received wireless LAN frames. In this case, the BSS station information updating unit 63 adds the MAC addresses of the MSs 23 and 24 obtained by the wireless LAN frame processing unit 62 to the BSS station table 64.

The BSS station table 64 stores the MAC addresses of the MSs 23 and 24 located in the BSS coordinated by the MN5 15 according to the update of the BSS station information updating unit 63.

Referring to FIG. 6, the wireless mesh network module 151 of FIG. 5 includes a station information advertisement frame generating unit 65, a wireless mesh network transmitting/receiving unit 66, a wireless mesh network frame processing unit 67, a routing unit 68, a forwarding table 69, an ESS station information updating unit 610, and an ESS station table 611.

The station information advertisement frame generating unit 65 generates a station information advertisement frame including the MAC address of the MN5 15 and the MAC addresses of the MSs 23 and 24 stored in the BSS station table 64 to indicate that the MSs 23 and 24 are located in a wireless LAN coordinated by the MN5 15.

Figure 7:
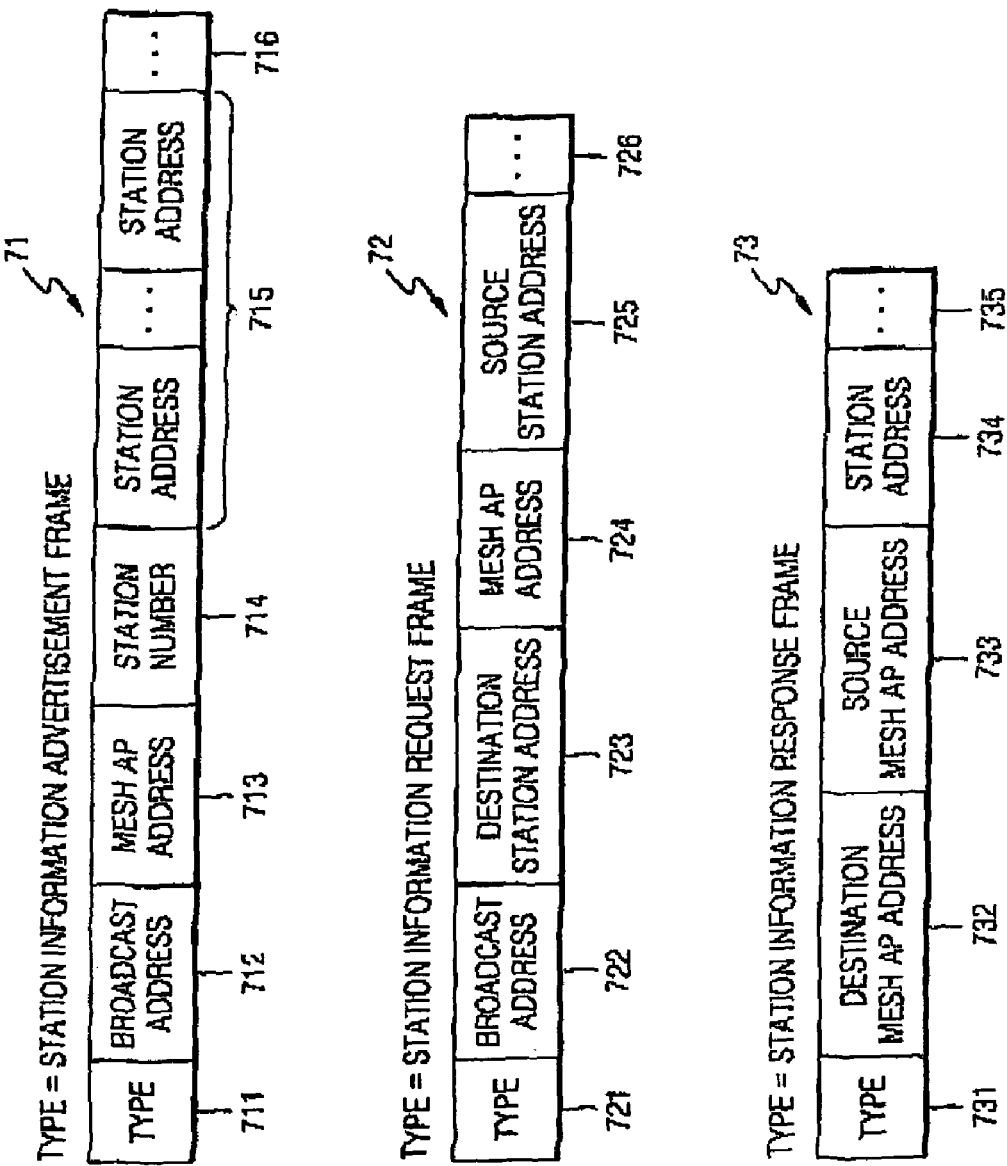
FIG. 7 illustrates formats of wireless mesh network frames according to an embodiment of the present invention.

FIG. 7 illustrates formats of wireless mesh network frames according to an embodiment of the present invention.

Referring to FIG. 7, a station information advertisement frame 71 includes a type field 711, a broadcast address field 712, a mesh AP address field 713, a station number field 714, station address fields 715, and other fields 716.

In the type field 711, a value indicating that the type of a wireless mesh network frame is a station information advertisement frame is recorded. In the broadcast address field 712, a broadcast address indicating that the station information advertisement frame is broadcasted to all the mobile nodes in the wireless mesh network is recorded. In the mesh AP address field 713, the MAC address of a mobile node that serves as a node in the wireless mesh network and as an AP that coordinates a wireless LAN, i.e., the MAC address of a mesh AP, is recorded. In the station number field 714, a value indicating the number of mobile stations located in a BSS coordinated by a mobile node is recorded. By referring to the value recorded in the station number field 714, the number of station address fields 715 can be determined. In the station address fields 715, the MAC addresses of the mobile stations located in the BSS coordinated by the mobile node are recorded.

In the case of the MN5 15 of FIG. 6, the MAC address of the MN5 15 serving as a mesh AP is recorded in the mesh AP address field 713 and the number of MSs 23 and 24 located in the BSS coordinated by the MN5 15, i.e., 2, is recorded in the station number field 714. In addition, there are two station address fields 715, in which the MAC address of the MS3 23 and the MAC address of the MS4 24 are recorded, respectively.

The wireless mesh network transmitting/receiving unit 66 transmits the station information advertisement frame generated by the station information advertisement frame generating unit 65 or wireless mesh network frames transmitted from other mobile nodes over the wireless mesh network. The wireless mesh network transmitting/receiving unit 66 may transmit the station information advertisement frame 71 to the MN3 13 corresponding to a next hop determined by the routing unit 68 in various ways as described below.

In other words, the wireless mesh network transmitting/receiving unit 66 may transmit the station information advertisement frame 71 periodically or when information about mobile stations located in a BSS is changed by the update of the BSS station information updating unit 63. The former is advantageous in that the reception rate of the station information advertisement frame 71 for mobile nodes in the wireless mesh network is high, but the bandwidth of a wireless communication channel is seriously wasted. In contrast, the latter can reduce bandwidth waste of a wireless communication channel, but the reception rate of the station information advertisement frame 71 for mobile nodes in the wireless mesh network is low.

As a combination of the former and the latter, the wireless mesh network transmitting/receiving unit 66 may periodically transmit the station information advertisement frame 71 during a predetermined period if information about mobile stations in a BSS is changed by the update of the BSS station information updating unit 63.

If the analysis result of the wireless mesh network frame processing unit 67 indicates that the survival time of traffic is shorter than a first threshold value and traffic is dispersed by a value that is greater than a second threshold value, the wireless mesh network transmitting/receiving unit 66 transmits the station information advertisement frame 71 including information about both the MSs 23 and 24 located in the BSS coordinated by the MN5 15. In this case, the amount of data exchanged between mobile stations is small and most of the mobile stations participate in communication.

The wireless mesh network frame processing unit 67 analyzes the wireless mesh network frame received via the wireless mesh network transmitting/receiving unit 66 and processes the wireless mesh network frame according to the analysis result. More specifically, the wireless mesh network frame processing unit 67 monitors wireless mesh network frames transmitted or received through the wireless mesh network and analyzes traffic patterns of the wireless mesh network frames. For example, the wireless mesh network frame processing unit 67 can analyze traffic patterns of the wireless mesh network frames using a traffic pattern analyzing solution in which logs for traffic of wireless mesh network frames are recorded in mobile nodes during a predetermined period to determine which mobile node communicates and for how long and how often it communicates, and the recorded logs are collected in a mobile node.

The wireless mesh network frame processing unit 67 analyzes the wireless mesh network frame received via the wireless mesh network transmitting/receiving unit 66 to determine if the received wireless mesh network frame is the station information advertisement frame 71. If the received wireless mesh network frame is the station information advertisement frame 71, the wireless mesh network frame processing unit 67 obtains information about the MSs 21 and 22 from the station information advertisement frame 71. The information about the MSs 21 and 22 includes the MAC addresses of the MSs 21 and 22 and the MAC address of the MN1 11 to indicate the MSs 21 and 22 are located in the BBS coordinated by the MN1 11.

If the received wireless mesh network frame is not the station information advertisement frame 71, the wireless mesh network frame processing unit 67 processes the wireless mesh network frame according to a policy prescribed for the wireless mesh network frame. For example, if the wireless mesh network frame received via the wireless mesh network transmitting/receiving unit 66 includes data to be transmitted to one of the MSs 23 and 24 located in the BSS coordinated by the MN5 15, it outputs the data to the wireless LAN module 152 so that the data arrives at one of the MSs 23 and 24 through the BSS.

The routing unit 68 determines a next hop in a wireless mesh network according to a routing protocol. The routing protocol is used to select the optimal route from various paths between a source and a destination. Conventional representative routing protocols used in a third layer of a wired communication environment include a routing information protocol (RIP), an open shortest path first (OSPF), and a border gateway protocol (BGP).

The forwarding table 69 stores the MAC address of a destination mobile node and the MAC address of a mobile node corresponding to a next hop determined by the routing unit 68. In other words, the forwarding table 69 includes entries, in which the MAC address of a destination mobile node and the MAC address of a mobile node corresponding to a next hop based on the optimal path to the destination mobile node are mapped.

The ESS station information updating unit 610 updates mobile station information stored in the ESS station table 611 using information obtained by the wireless mesh network frame processing unit 67. In other words, the ESS station information updating unit 610 maps the MAC addresses of the MSs 21 and 22 obtained by the wireless mesh network frame processing unit 67 to the MAC address of the MN1 11 of the forwarding table 69 and adds the MAC addresses of the MSs 21 and 22 to the ESS station table 611.

To indicate that the MSs 21 and 22 are located in the wireless LAN coordinated by the MN1 11, the ESS station table 611 stores the MAC addresses of the MSs 21 and 22 added by the ESS station information updating unit 610 and the MAC address of the MN1 11 of the forwarding table 69 that are mapped to each other.

Figure 8:
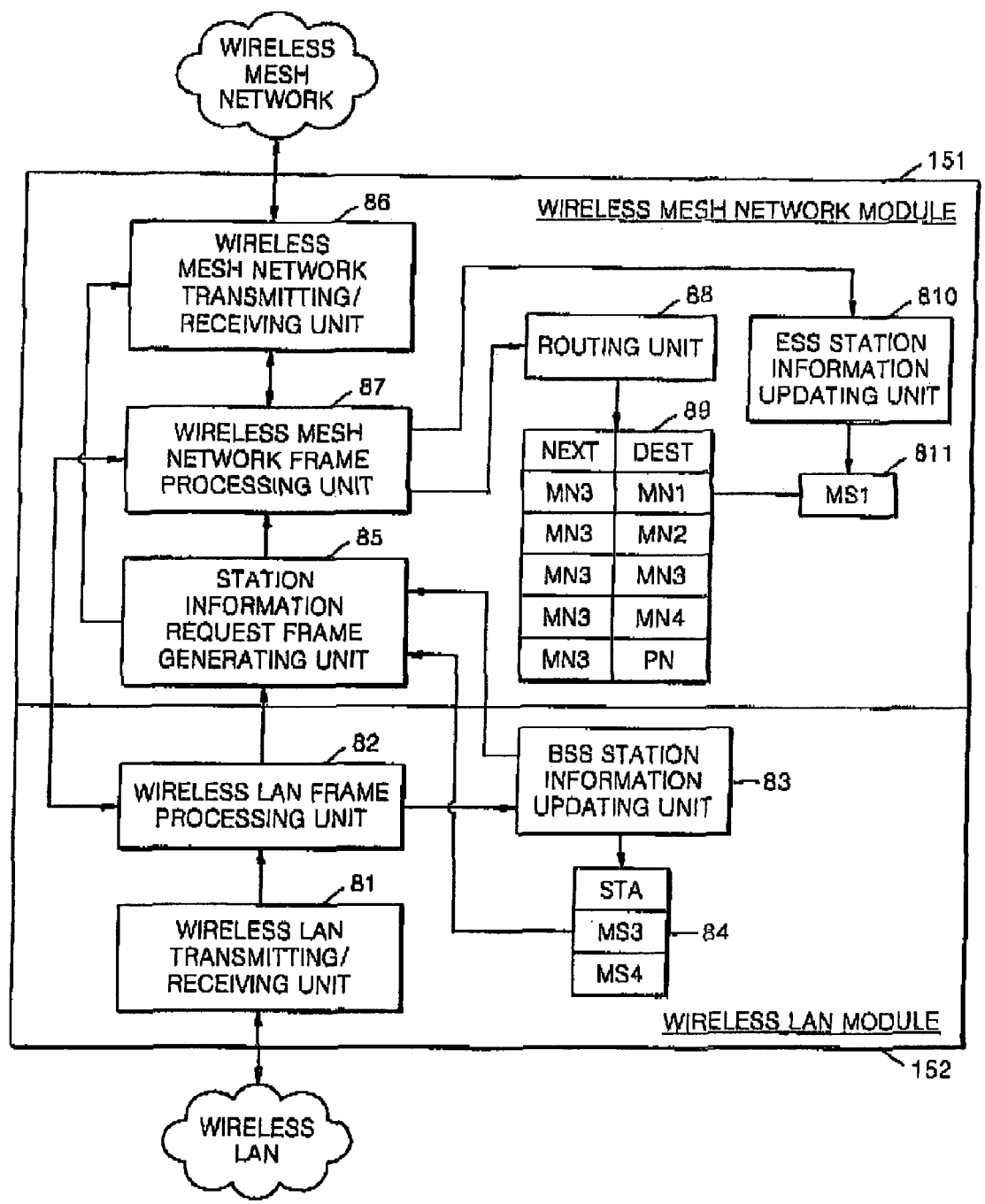
FIG. 8 is a block diagram of a mobile node illustrated in FIG. 5 according to an embodiment of the present invention.

FIG. 8 is a block diagram of the MN5 15 illustrated in FIG. 5 according to an embodiment of the present invention. Referring to FIG. 8, the MN5 15 includes the wireless mesh network module 151 and the wireless LAN module 152 and has a function of providing mobile station information to other mobile nodes over the wireless mesh network and a function of obtaining the mobile station information from the other mobile nodes. However, it can be understood by those skilled in the art that the MN5 15 may include other components in addition to those illustrated in FIG. 8 to support other functions.

Referring to FIG. 8, the wireless LAN module 152 of the MN5 15 illustrated in FIG. 5 includes a wireless LAN transmitting/receiving unit 81, a wireless LAN frame processing unit 82, a BSS station information updating unit 83, and a BSS station table 84.

The wireless LAN transmitting/receiving unit 81 transmits and receives a wireless LAN frame through a BSS coordinated by the MN5 15.

The wireless LAN frame processing unit 82 analyzes the wireless LAN frame received via the wireless LAN transmitting/receiving unit 81 and processes the wireless LAN frame based on the analysis result. More specifically, the wireless LAN frame processing unit 82 analyzes the wireless LAN frame to determine if the wireless LAN frame received through the BSS coordinated by the MN5 15 is related to authentication and association with respect to the BSS.

The wireless LAN frame processing unit 82 obtains information about the MS3 23 located in the BSS coordinated by the MN5 15 if the wireless LAN frame received through the BSS coordinated by the MN5 15 is related to authentication and association with respect to the BSS. The information about the MS3 23 includes the MAC address of the MS3 23 and the MAC address of the MN5 15 to indicate that the MS3 23 is located in the BSS coordinated by the MN5 15.

If the wireless LAN frame received through the BSS is not related to authentication and association with respect to the BSS, the wireless LAN frame processing unit 82 processes a wireless LAN frame according to a policy prescribed for the wireless LAN frame. For example, if the wireless LAN frame received through the BSS includes data to be transmitted to the MS1 21 located in another BSS, the wireless LAN frame processing unit 82 outputs the data to the wireless mesh network module 151 so that the data arrives at the MS1 21 located in another BSS over the wireless mesh network and searches in a forwarding table 89 and an ESS station table 811 for the MAC address of the MN1 11 mapped to the MAC address of the MS1 21.

If the wireless LAN frame processing unit 82 fails to obtain the MAC address of the MN1 11 mapped to the MAC address of the MS1 21, it instructs a station information request frame generating unit 85 to generate a station information request frame. If the wireless LAN frame processing unit 82 obtains the MAC address of the MN1 11 mapped to the MAC address of the MS1 21, it outputs the obtained MAC address to the wireless mesh network module 151.

The BSS station information updating unit 83 updates the MAC addresses of mobile stations stored in the BSS station table 84 using the information obtained by the wireless LAN frame processing unit 82.

The BSS station table 84 stores the MAC addresses of the MSs 23 and 24 located in the BSS coordinated by the MN5 15 according to the update of the BSS station information updating unit 83.

Referring to FIG. 8, the wireless mesh network module 151 of the MN5 15 illustrated in FIG. 5 includes the station information request frame generating unit 85, a wireless mesh network transmitting/receiving unit 86, a wireless mesh network frame processing unit 87, a routing unit 88, the forwarding table 89, an ESS station information updating unit 810, and the ESS station table 811.

If the wireless LAN frame processing unit 82 fails to obtain the MAC address of the MN1 11 mapped to the MAC address of the MS1 21, the station information request frame generating unit 85 generates a station information request frame requesting the MAC address of the MN1 11 mapped to the MAC address of the MS1 21. The station information request frame includes the MAC address of the MN5 15 and the MAC addresses of the MSs 23 and 24 stored in the BSS station table 64 so as to request the MAC address of the MN1 11 mapped to the MAC address of the MS1 21 and to indicate that the MSs 23 and 24 are located in a wireless LAN coordinated by the MN5 15.

Referring to FIG. 7, a station information request frame 72 includes a type field 721, a broadcast address field 722, a destination station address field 723, a mesh AP address field 724, a source station address field 725, and other fields 726.

In the type field 721, a value indicating that the type of the wireless mesh network frame is a station information request frame is recorded. In the broadcast address field 722, a broadcast address indicating that the station information request frame is broadcasted to all the mobile nodes in the wireless mesh network is recorded. In the destination station address field 723, the MAC address of a mobile station to which data included in the wireless LAN frame is destined is recorded. In the mesh AP address field 724, the MAC address of a mobile node that serves as both a node in the wireless mesh network and an AP that coordinates a wireless LAN, i.e., the MAC address of a mesh AP is recorded. In the source station address field 725, the MAC address of a mobile station from which data included in the wireless LAN frame originates is recorded.

In the case of the MN5 15 of FIG. 8, the MAC address of the MS3 23 is recorded in the destination station address field 723, the MAC address of the MN5 15 is recorded in the mesh AP address field 724, and the MAC address of the MS1 21 is recorded in the source station address field 725.

The wireless mesh network transmitting/receiving unit 86 transmits the station information request frame generated by the station information request frame generating unit 85 or a data frame generated by the wireless mesh network frame processing unit 87 over the wireless mesh network. If the analysis result obtained by the wireless mesh network frame processing unit 87 indicates that the survival time of traffic is longer than the first threshold value and traffic is concentrated by a value that is greater than the second threshold value, the wireless mesh network frame transmitting/receiving unit 86 transmits a station information response frame 73 including only information about the MS3 23 related to traffic from the MSs 23 and 24 located in the BSS coordinated by the MN5 15.

The wireless mesh network frame processing unit 87 analyzes the wireless mesh network frame received via the wireless mesh network transmitting/receiving unit 86 and processes the received wireless mesh network frame based on the analysis result. More specifically, the wireless mesh network frame processing unit 87 monitors wireless mesh network frames transmitted and received over the wireless mesh network and analyzes traffic patterns of the wireless mesh network frames using the monitoring results.

The wireless mesh network frame processing unit 87 analyzes a wireless mesh network frame to determine if the wireless mesh network frame received via the wireless mesh network transmitting/receiving unit 86 is the station information response frame 73. If the received wireless mesh network frame is the station information response frame 73 that is a response to the station information request frame 72 transmitted from the wireless mesh network transmitting/receiving unit 86, the wireless mesh network frame processing unit 87 obtains information about the MS1 21 located in the BSS coordinated by the MN1 11 using the station information response frame 73. The station information response frame 73 includes the MAC address of the MS1 21 and the MAC address of the MN1 11 to indicate that the MS1 21 is located in the BSS coordinated by the MN1 11.

If the wireless LAN frame processing unit 82 obtains the MAC address of the MN1 11 mapped to the MAC address of the MS1 21, the wireless mesh network frame processing unit 87 generates a data frame using the MAC address of the MN1 11 mapped to the MAC address of the MS1 21 as the MAC address of a destination mobile node. The data frame includes data included in the wireless LAN frame.

The routing unit 88 determines a next hop in the wireless mesh network according to a routing protocol.

The forwarding table 89 stores the MAC address of the destination mobile node and the MAC address of a mobile node corresponding to the next hop determined by the routing unit 88.

The ESS station information updating unit 810 updates mobile station information stored in the ESS station table 811 using the information obtained by the wireless mesh network frame processing unit 87. In other words, the ESS station information updating unit 810 maps the MAC address of the MS1 21 obtained by the wireless mesh network frame processing unit 87 to the MAC address of the MN1 11 of the forwarding table 89 and adds the MAC address of the MS1 21 to the ESS station table 811.

To indicate that the MS1 21 is located in the wireless LAN coordinated by the MN1 11, the ESS station table 811 stores the MAC address of the MS1 21 added by the ESS station information updating unit 810 and the MAC address of the MN1 11 of the forwarding table 89 that are mapped to each other.

Figure 9:
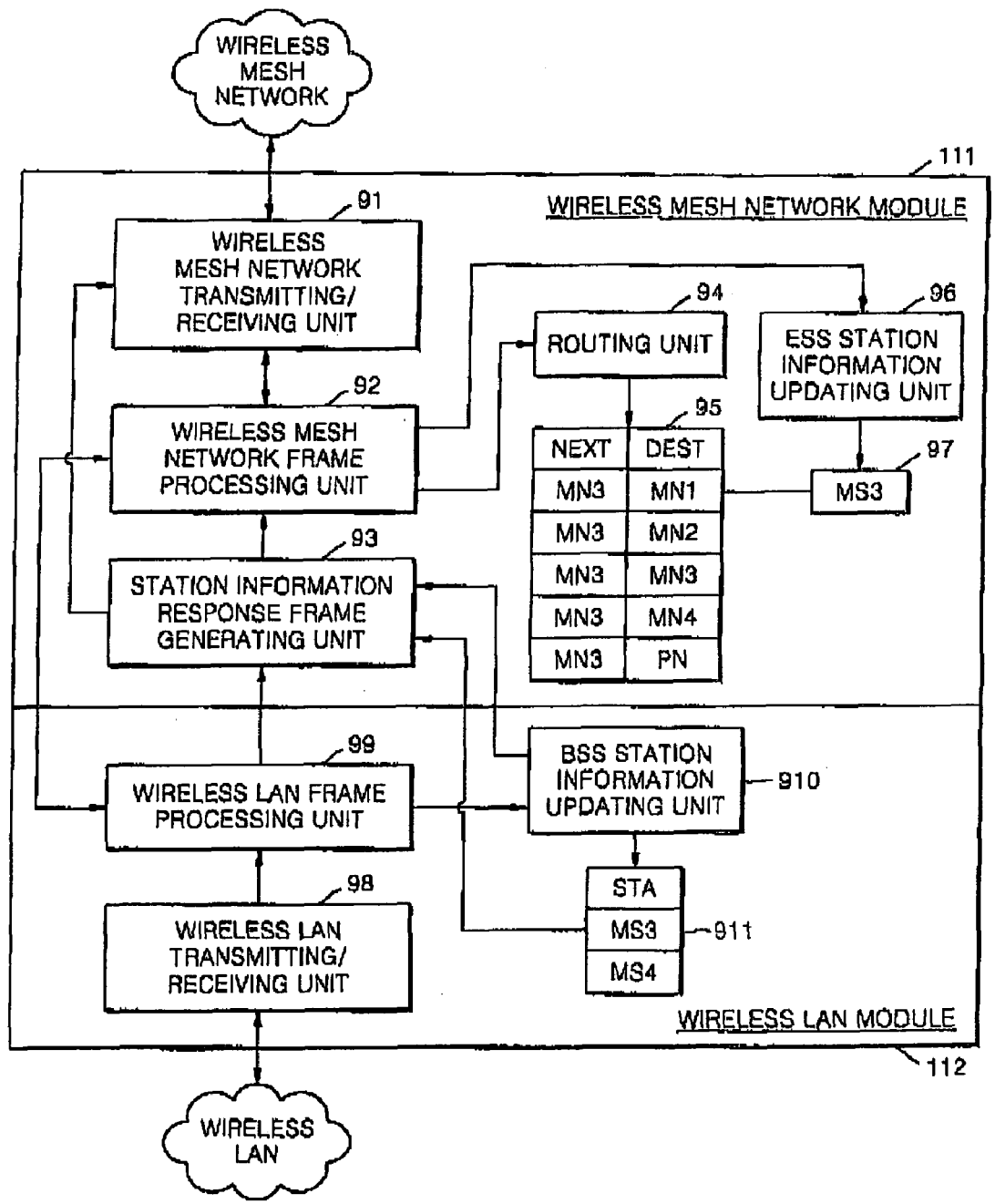
FIG. 9 is a block diagram of a mobile node illustrated in FIG. 5 according to another embodiment of the present invention.

FIG. 9 is a block diagram of the MN1 11 illustrated in FIG. 5 according to an embodiment of the present invention. The MN1 11 of FIG. 5 includes the wireless mesh network module 111 and the wireless LAN module 112 and has a function of providing mobile station information to other mobile nodes over the wireless mesh network and a function of obtaining the mobile station information from the other mobile nodes. However, it can be understood by those skilled in the art that the MN1 11 may include other components in addition to those illustrated in FIG. 9 to support other functions.

Referring to FIG. 9, the wireless mesh network module 111 of the MN1 11 of FIG. 5 includes a wireless mesh network transmitting/receiving unit 91, a wireless mesh network frame processing unit 92, a station information response frame generating unit 93, a routing unit 94, a forwarding table 95, an ESS station information updating unit 96, and an ESS station table 97.

The wireless mesh network transmitting/receiving unit 91 receives a wireless mesh network frame or transmits a station information response frame generated by the station information response frame generating unit 93 over the wireless mesh network.

The wireless mesh network frame processing unit 92 analyzes a wireless mesh network frame received via the wireless mesh network transmitting/receiving unit 91 and processes the received wireless mesh network frame according to the analysis result. More specifically, the wireless mesh network frame processing unit 92 analyzes the received wireless mesh network frame to determine if the received wireless mesh network frame is a station information request frame requesting the MAC address of the MN1 11 mapped to the MAC address of the MS1 21.

If the received wireless mesh network frame is the station information request frame, the wireless mesh network frame processing unit 92 obtains information about the MS3 23 located in the BSS coordinated by the MN5 15 that transmits the station information request frame using the station information request frame. The obtained information includes the MAC address of the MS3 23 and the MAC address of the MN5 15 to indicate that the MS3 23 is located in the BSS coordinated by the MN5 15.

If the received wireless mesh network frame is not the station information request frame, the wireless mesh network frame processing unit 92 processes the wireless mesh network frame according to a policy prescribed for the wireless mesh network frame. For example, when the received wireless mesh network frame includes data to be transmitted to one of the MSs 21 and 22 located in the BSS coordinated by the MN1 11, the wireless mesh network frame processing unit 92 outputs the data to the wireless LAN module 112 so that the data arrives at one of the MSs 21 and 22 through the BSS.

If the received wireless mesh network frame is the station information request frame, the station information response frame generating unit 93 generates a station information response frame that is a response to the station information request frame. The station information response frame includes information obtained by a wireless LAN frame processing unit 99. The information obtained by the wireless LAN frame processing unit 99 includes the MAC address of the MS1 21 and the MAC address of the MN1 11 to indicate that the MS1 21 is located in the BSS coordinated by the MN1 11.

Referring to FIG. 7, the station information response frame 73 includes a type field 731, a destination mesh AP address field 732, a source mesh AP address field 733, a station address field 734, and other fields 735.

In the type field 731, a value indicating that the type of the wireless mesh network frame is a station information response frame is recorded. In the destination mesh AP address field 732, the MAC address of a mesh AP to which the station information response frame 73 is destined is recorded. In the source mesh AP address field 733, the MAC address of a mesh AP from which the station information response frame 73 originates is recorded. In the station address field 734, the MAC address of a mobile station located in the BSS coordinated by the source mesh AP of the station information response frame 73 is recorded.

In the case of the MN1 11 of FIG. 9, the MAC address of the MN5 15 is recorded in the destination mesh AP address field 732, the MAC address of the MN1 11 is recorded in the source mesh AP address field 733, and the MAC address of the MS1 21 is recorded in the station address field 734.

The routing unit 94 determines a next hop in the wireless mesh network according to a routing protocol.

The forwarding table 95 stores the MAC address of a destination mobile node and the MAC address of a mobile node corresponding to the next hop determined by the routing unit 94.

The ESS station information updating unit 96 updates mobile station information stored in the ESS station table 97 using the information obtained by the wireless mesh network frame processing unit 92. In other words, the ESS station information updating unit 96 maps the MAC address of the MS3 23 obtained by the wireless mesh network frame processing unit 92 to the MAC address of the MN5 15 of the forwarding table 95 and adds the MAC address of the MS3 23 to the ESS station table 97.

To indicate that the MS3 23 is located in the wireless LAN coordinated by the MN5 15, the ESS station table 97 stores the MAC address of the MS3 23 added by the ESS station information updating unit 96 and the MAC address of the MN5 15 of the forwarding table 95 that are mapped to each other.

Referring to FIG. 9, the wireless LAN module 112 of the MN1 11 of FIG. 5 includes a wireless LAN transmitting/receiving unit 98, the wireless LAN frame processing unit 99, a BSS station information updating unit 910, and a BSS station table 911.

The wireless LAN transmitting/receiving unit 98 receives a wireless LAN frame from the MSs 21 and 22 located in the BSS coordinated by the MN5 15 and transmits the wireless LAN frame to the MSs 21 and 22.

The wireless LAN frame processing unit 99 analyzes the wireless LAN frame received via the wireless LAN transmitting/receiving unit 98 and processes the wireless LAN frame according to the analysis result. More specifically, the wireless LAN frame processing unit 99 analyzes the wireless LAN frame to determine if the wireless LAN frame received through the BSS coordinated by the MN1 11 is related to authentication and association with respect to the BSS or includes data to be transmitted to a mobile station located in another BSS.

If the received wireless LAN frame is related to authentication and association with respect to the BSS, the wireless LAN frame processing unit 99 obtains information about the MSs 21 and 22 located in the BSS using the received wireless LAN frame. The information about the MSs 21 and 22 includes MAC addresses of the MSs 21 and 22 and the MAC address of the MN1 11 to indicate that the MSs 21 and 22 are located in the BSS coordinated by the MN1 11. The MAC addresses of the MSs 21 and 22 are included in the wireless LAN frame received through the BSS and the MAC address of the MN1 11 is recorded in a wireless LAN card installed in the MN1 11.

If the received wireless LAN frame includes data to be transmitted to a mobile station located in another BSS, the wireless LAN frame processing unit 99 outputs the data to the wireless mesh network module 111 so that the data arrives at the mobile station located in another BSS over the wireless mesh network.

The BSS station information updating unit 910 updates the MAC addresses of mobile stations stored in the BSS station table 911 using the information obtained by the wireless LAN frame processing unit 99. For example, when the MSs 21 and 22 enter the BSS coordinated by the MN1 11 for the first time, the MSs 21 and 22 transmit wireless LAN frames related to authentication and association with respect to the BSS to the MN1 11, and the MN1 11 obtains the MAC addresses of the MSs 21 and 22 from the received wireless LAN frames. In this case, the BSS station information updating unit 910 adds the MAC addresses of the MSs 21 and 22 obtained by the wireless LAN frame processing unit 99 to the BSS station table 911.

The BSS station table 911 stores the MAC addresses of the MSs 21 and 22 located in the BSS coordinated by the MN1 11.

Figure 10:
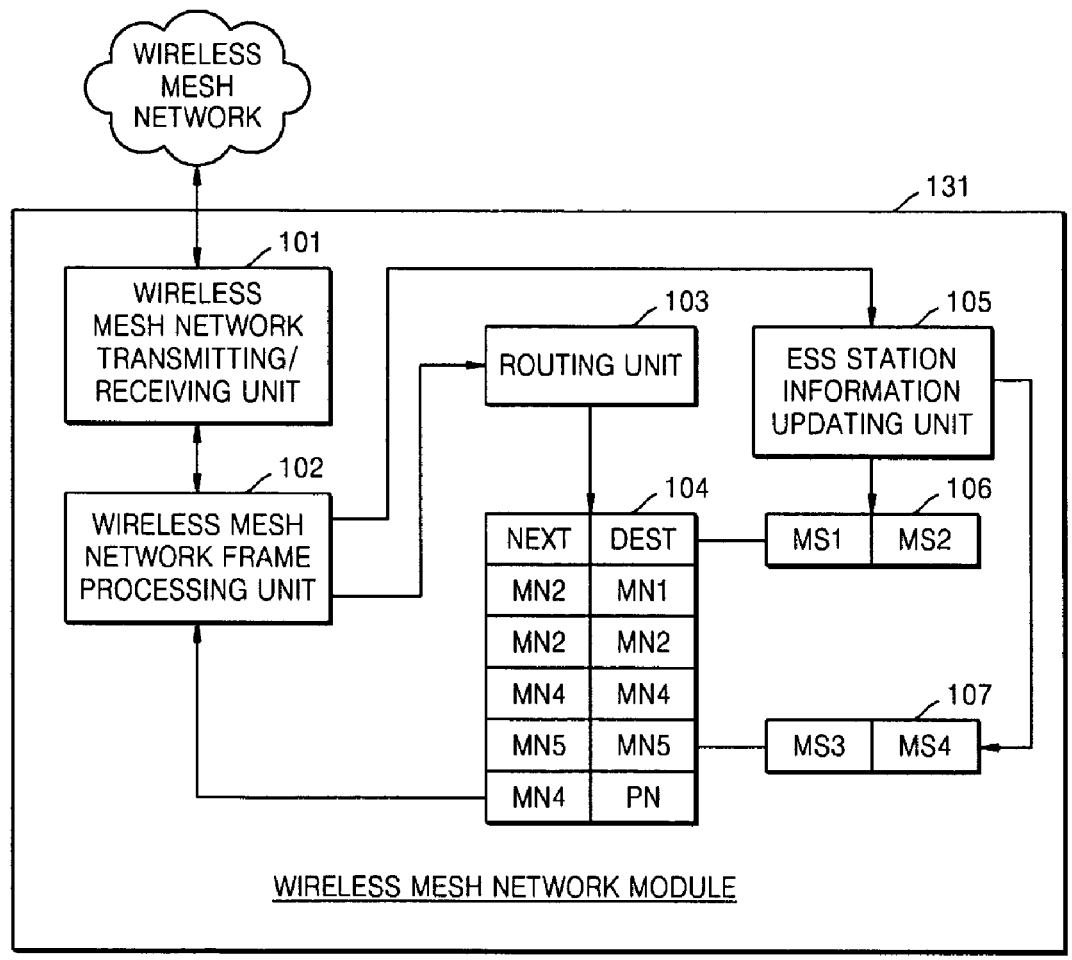
FIG. 10 is a block diagram of a mobile node illustrated in FIG. 4 according to another embodiment of the present invention.

FIG. 10 is a block diagram of the MN3 13 of FIG. 4 according to an embodiment of the present invention. The MN3 13 of FIG. 4 has a function of relaying mobile station information to other nodes over the wireless mesh network and a function of obtaining mobile station information from other nodes over the wireless mesh network. However, it can be understood by those skilled in the art that the MN3 13 may include other components in addition to those illustrated in FIG. 10 to support other functions.

Since the configuration of the MN3 13 of FIG. 5 is similar to that of the MN3 13 of FIG. 4, a detailed description thereof will not be given and only a difference between those configurations will be described.

Referring to FIG. 10, the wireless mesh network module 131 of the MN3 13 of FIG. 4 includes a wireless mesh network transmitting/receiving unit 101, a wireless mesh network frame processing unit 102, a routing unit 103, a forwarding table 104, an ESS station information updating unit 105, and an ESS station table 106.

The wireless mesh network transmitting/receiving unit 101 receives a wireless mesh network frame transmitted from another mobile node over the wireless mesh network or transmits the station information advertisement frame 71 converted by the wireless mesh network frame processing unit 102 over the wireless mesh network. The MN3 13 of FIG. 5 transmits the station information request frame 72 and the station information response frame 73 over the wireless mesh network.

The wireless mesh network frame processing unit 102 analyzes the wireless mesh network frame received via the wireless mesh network transmitting/receiving unit 101 and processes the received wireless mesh network frame according to the analysis result. More specifically, the wireless mesh network frame processing unit 102 analyzes the received wireless mesh network frame to determine if the received wireless mesh network frame is the station information advertisement frame 71 including information about a mobile station. The MN3 13 of FIG. 5 also analyzes the received wireless mesh network frame to determine if the received wireless mesh network frame is the station information request frame 72 or the station information response frame 73.

If the received wireless mesh network frame is the station information advertisement frame 71, the wireless mesh network frame processing unit 102 obtains information from the station information advertisement frame 71 about the MSs 21 and 22 located in the BSS coordinated by the MN1 11 that transmits the station information advertisement frame 71 or information about the MSs 23 and 24 located in the BSS coordinated by the MN5 15. The former information includes the MAC addresses of the MSs 21 and 22 and the MAC address of the MN1 11 to indicate that the MSs 21 and 22 are located in the BSS coordinated by the MN1 11. The latter information includes the MAC addresses of the MSs 23 and 24 and the MAC address of the MN5 15 to indicate that the MSs 23 and 24 are located in the BSS coordinated by the MN5 15.

If the received wireless mesh network frame is not the station information request frame 71, the wireless mesh network frame processing unit 102 processes the wireless mesh network frame according to a policy prescribed for the wireless mesh network frame.

The wireless mesh network frame processing unit 102 converts the received station information advertisement frame 71 into a station information advertisement frame to be transmitted to a mobile node corresponding to a next hop determined by the routing unit 103 by referring to next hop addresses of the forwarding table 104. The station information advertisement frame converted by the wireless mesh network frame processing unit 102 includes the obtained information about the MSs 21 and 22 or the obtained information about the MSs 23 and 24.

The MS3 23 of FIG. 5 obtains information from the station information request frame 72 about the MS3 23 located in the BSS coordinated by the MN5 15 that transmits the station information request frame 72 or information from the station information response frame 73 about the MS1 21 located in the BSS coordinated by the MN1 11 that transmits the station information response frame 73. The former information includes the MAC address of the MS3 23 and the MAC address of the MN5 15 to indicate that the MS3 23 is located in the BSS coordinated by the MN5 15. The latter information includes the MAC address of the MS1 21 and the MAC address of the MN1 11 to indicate that the MS1 21 is located in the BSS coordinated by the MN1 11.

The routing unit 103 determines a next hop in the wireless mesh network according to a routing protocol.

The forwarding table 104 stores the MAC address of a destination mobile address and the MAC address of a mobile node corresponding to the next hop determined by the routing unit 103.

The ESS station information updating unit 105 updates mobile station information stored in the ESS station table 106 using the information obtained by the wireless mesh network frame processing unit 102. In other words, the ESS station information updating unit 105 maps the MAC addresses of the MSs 21 and 22 obtained by the wireless mesh network frame processing unit 102 to the MAC address of the MN1 11 of the forwarding table 104 and adds the MAC addresses of the MSs 21 and 22 to the ESS station table 106 or maps the MAC addresses of the MSs 23 and 24 obtained by the wireless mesh network frame processing unit 102 to the MAC address of the MN5 15 of the forwarding table 104 and adds the MAC addresses of the MSs 23 and 24 to the ESS station table 106.

The MN3 13 of FIG. 5 maps the MAC address of the MS1 21 obtained by the wireless mesh network frame processing unit 102 to the MAC address of the MN1 11 of the forwarding table 104 and adds the MAC address of the MS1 21 to the ESS station table 106 or maps the MAC address of the MS3 23 obtained by the wireless mesh network frame processing unit 102 to the MAC address of the MN5 15 of the forwarding table 104 and adds the MAC address of the MS3 23 to the ESS station table 106.

To indicate that the MSs 21 and 22 are located in the wireless LAN coordinated by the MN1 11, the ESS station table 106 stores the MAC addresses of the MSs 21 and 22 added by the ESS station information updating unit 105 and the MAC address of the MN1 11 that are mapped to each other or the MAC addresses of the MSs 23 and 24 added by the ESS station information updating unit 105 and the MAC address of the MN5 15 that are mapped to each other.

The MN3 13 of FIG. 5 stores the MAC address of the MS1 21 added by the ESS station information updating unit 105 and the MAC address of the MN1 11 of the forwarding table 104 that are mapped to each other to indicate that the MS1 21 is located in the wireless LAN coordinated by the MN1 11, or stores the MAC address of the MS3 23 added by the ESS station information updating unit 105 and the MAC address of the MN5 15 of the forwarding table 104 mapped to each other to indicate that the MS3 23 is located in the wireless LAN coordinated by the MN5 15.

Figure 11:
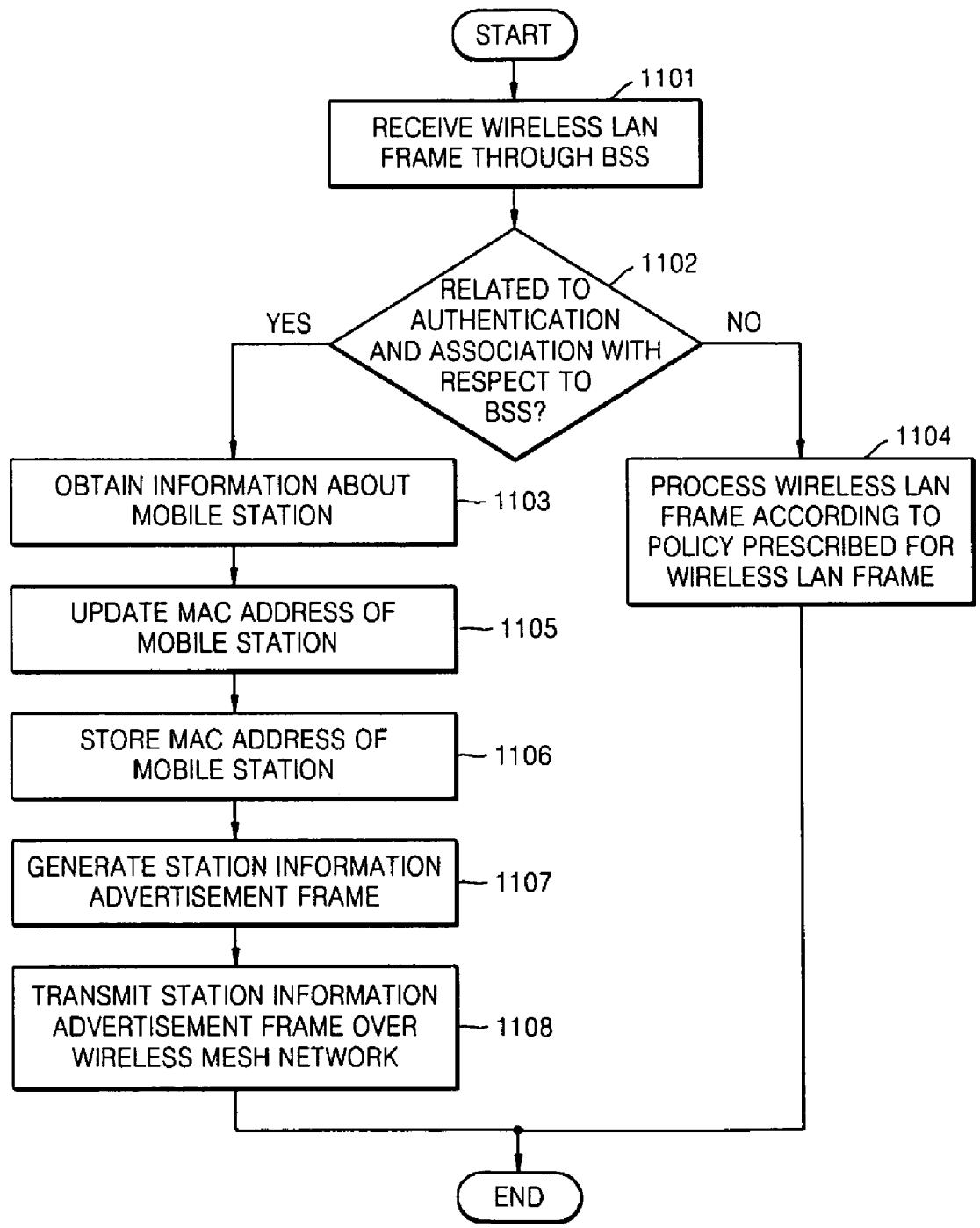
FIG. 11 is a flowchart illustrating a method of distributing mobile station information according to an embodiment of the present invention.

FIG. 11 is a flowchart illustrating a method of distributing mobile station information according to an embodiment of the present invention.

The method of FIG. 11 includes operations that are processed sequentially by the MN5 15 of FIG. 6. Thus, the description of the MN5 15 of FIG. 6 will not be given again.

In operation 1101, the MN5 15 receives a wireless LAN frame through its coordinated BSS.

In operation 1102, the MN5 15 analyzes the received wireless LAN frame.

In operation 1103, if the received wireless LAN frame is related to authentication and association with respect to the BSS, the MN5 15 obtains information about a mobile station located in the BSS using the received wireless LAN frame.

In operation 1104, if the received wireless LAN frame is not related to authentication and association with respect to the BSS, the MN5 15 processes the received wireless LAN frame according to a policy prescribed for the wireless LAN frame.

In operation 1105, the MN5 15 updates the MAC address of a mobile station stored in a BSS station table using the obtained information.

In operation 1106, the MAC address of the mobile station is stored in the BSS station table using the obtained information.

In operation 1107, the MN5 15 generates a station information advertisement frame including the MAC address of the MN5 15 and the stored MAC address of the mobile station to indicate that the mobile station is located in a wireless LAN coordinated by the MN5 15.

In operation 1108, the MN5 15 broadcasts the generated station information advertisement frame over the wireless mesh network.

Figure 12:
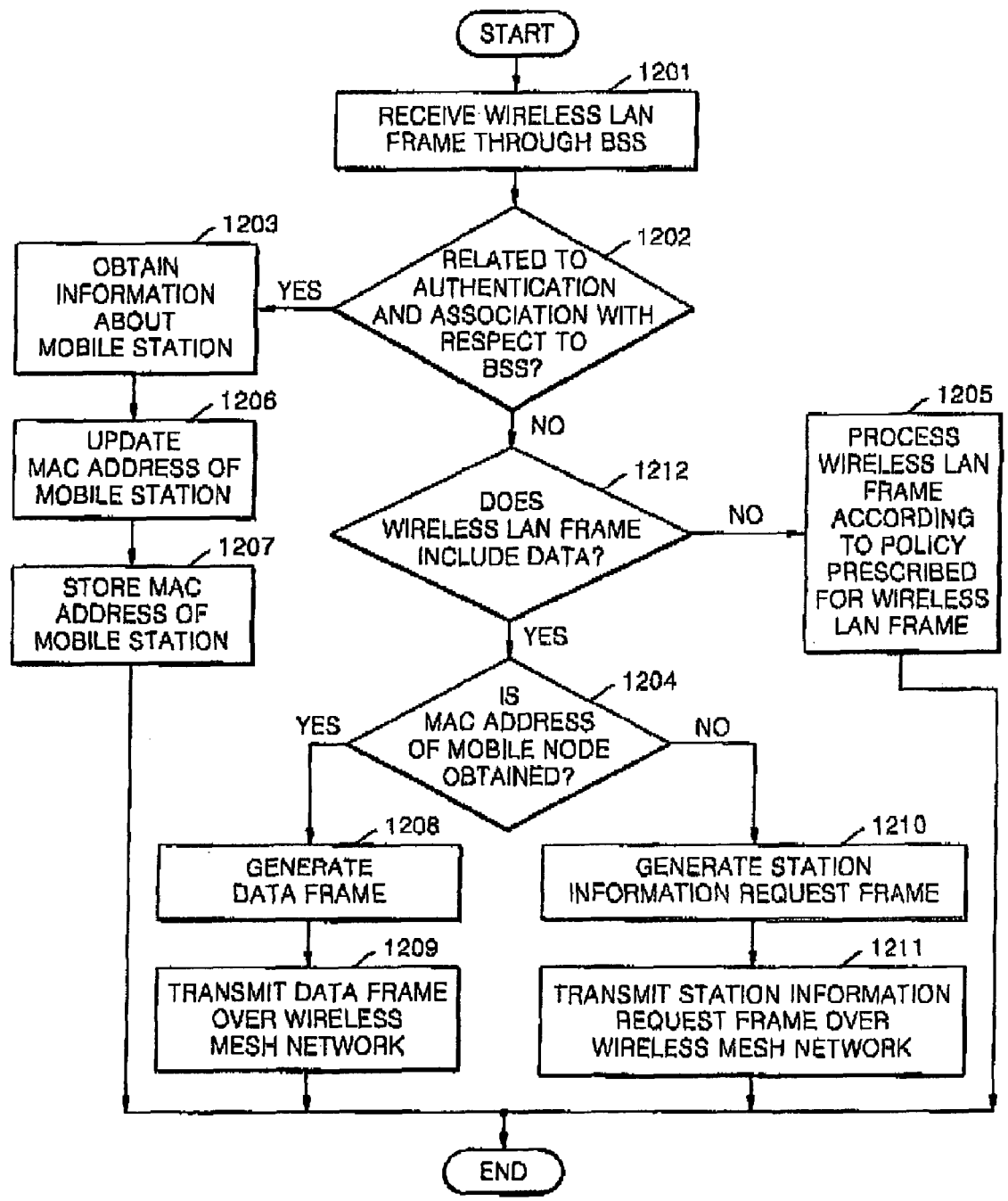
FIG. 12 is a flowchart illustrating a method of distributing mobile station information according to another embodiment of the present invention.

FIG. 12 is a flowchart illustrating a method of distributing mobile station information according to another embodiment of the present invention.

The method FIG. 12 includes operations that are processed sequentially by the MN5 15 of FIG. 8. Thus, the description of the MN5 15 of FIG. 8 will not be given again.

In operation 1201, the MN5 15 receives a wireless LAN frame through its coordinated BSS.

In operation 1202, the MN5 15 analyzes the received wireless LAN frame.

In operation 1203, if the received wireless LAN frame is related to authentication and association with respect to the BSS, the MN5 15 obtains information about a mobile station located in the BSS using the received wireless LAN frame.

In operation 1212, it is determined whether the received wireless LAN frame includes data to be transmitted to a mobile station in another BSS.

In operation 1204, if the received wireless LAN frame includes data to be transmitted to a mobile station in another BSS, the MN5 15 outputs the data to a wireless mesh network module so that the data arrives at the mobile station in another BSS over the wireless mesh network and searches in a forwarding table and an ESS station table for the MAC address of the mobile station and the MAC address of a mobile node mapped thereto.

In operation 1205, if the received wireless LAN frame is not related to authentication and association with respect to the BSS, the MN5 15 processes the received wireless LAN frame according to a policy prescribed for the wireless LAN frame.

In operation 1206, the MN5 15 updates the MAC address of a mobile station stored in a BSS station table using the obtained information.

In operation 1207, the MN5 15 stores the updated MAC address of the mobile station located in its coordinated BSS.

In operation 1208, if the MN5 15 obtains the MAC address of the mobile node mapped to the MAC address of the mobile station, the MN5 15 generates a data frame that uses the MAC address of the mobile node mapped to the MAC address of the mobile station as the MAC address of a destination mobile node.

In operation 1209, the MN5 15 transmits the generated data frame over the wireless mesh network.

In operation 1210, if the MN5 15 fails to obtain the MAC address of the mobile node mapped to the MAC address of the mobile station, the MN5 15 generates a station information request frame. The station information request frame includes the MAC address of the MN5 15 and the MAC addresses of the mobile stations stored in the BSS station table so as to request the MAC address of the mobile node mapped to the MAC address of the mobile station and indicate that the mobile station is located in the wireless LAN coordinated by the MN5 15.

In operation 1211, the MN5 15 broadcasts the generated station information request frame over the wireless mesh network.

Figure 13:
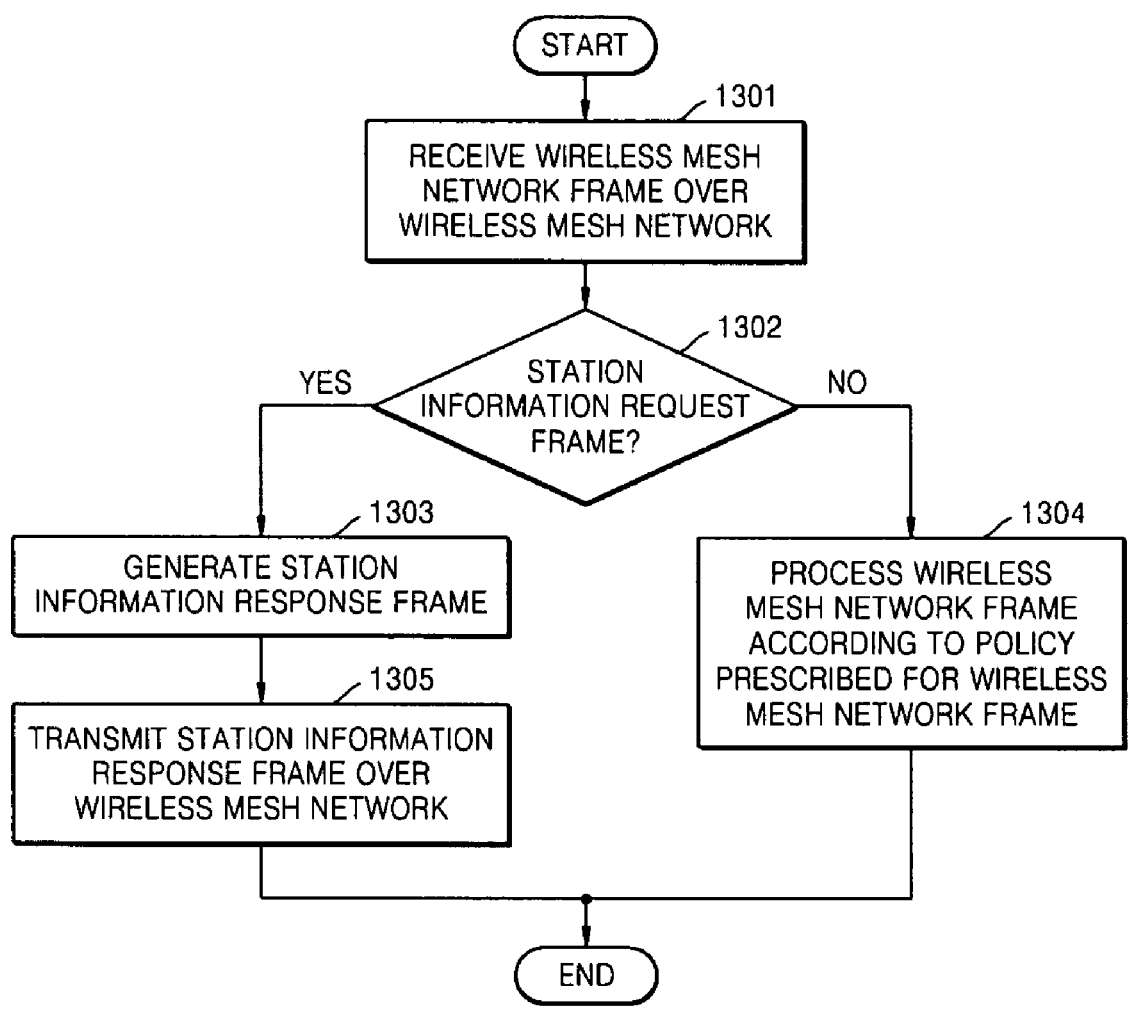
FIG. 13 is a flowchart illustrating a method of distributing mobile station information according to another embodiment of the present invention.

FIG. 13 is a flowchart illustrating a method of distributing mobile station information according to another embodiment of the present invention.

The method of FIG. 13 includes operations that are processed sequentially by the MN1 11 of FIG. 9. Thus, the description of the MN1 11 of FIG. 9 will not be given again.

In operation 1301, the MN1 11 receives a wireless mesh network frame over a wireless mesh network.

In operation 1302, the MN1 11 analyzes the received wireless mesh network frame.

In operation 1303, if the received wireless mesh network frame is a station information request frame, the MN1 11 generates a station information response frame that is a response to the station information request frame. The station information response frame includes the MAC address of a mobile node mapped to the MAC address of a mobile station included in the station information request frame.

In operation 1304, if the received wireless mesh network frame is not the station information request frame, the MN1 11 processes the received wireless mesh network frame according to a policy prescribed for the wireless mesh network frame.

In operation 1305, the MN1 11 unicasts the generated station information response frame over the wireless mesh network.

Figure 14:
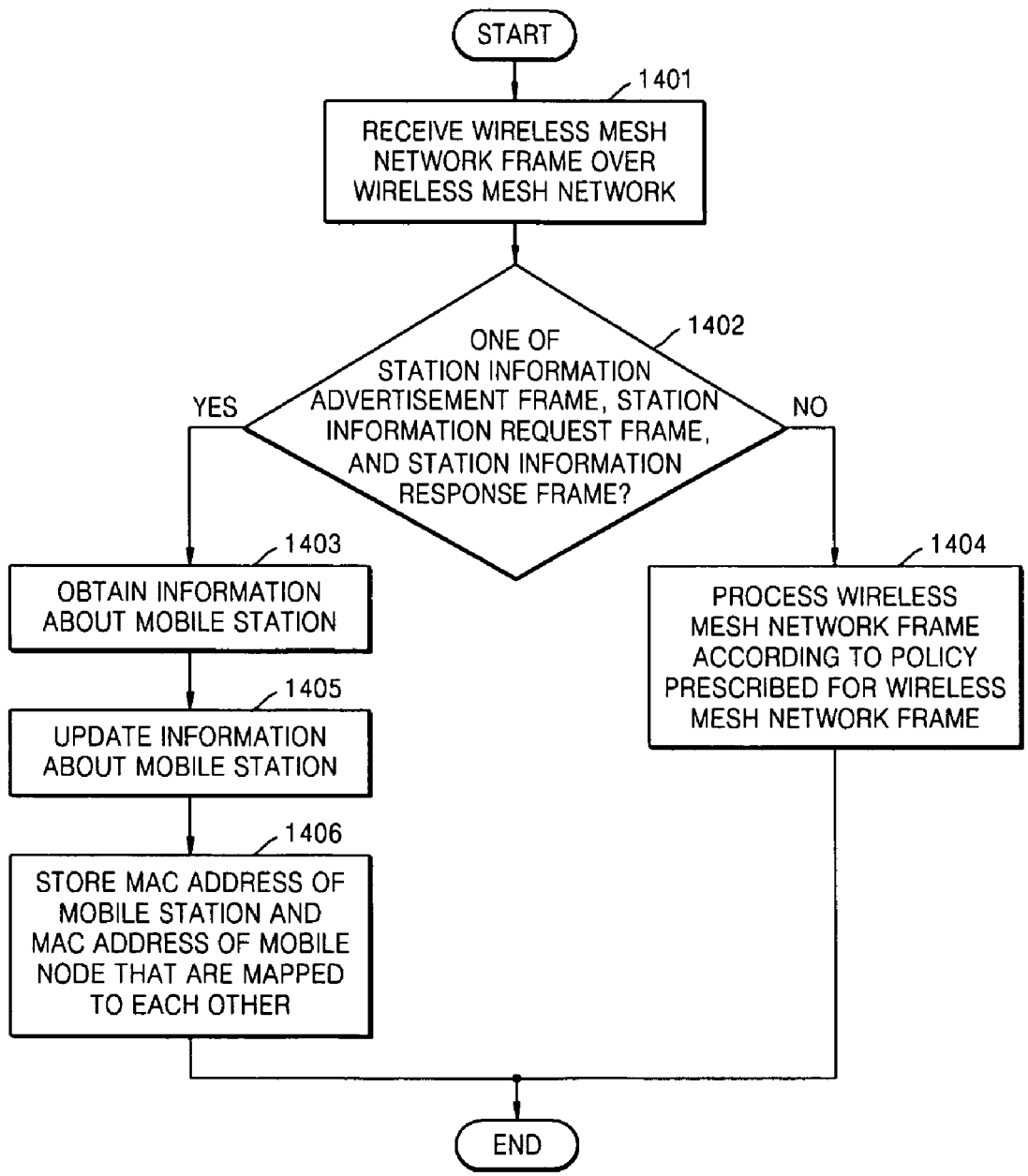
FIG. 14 is a flowchart illustrating a method of obtaining mobile station information according to an embodiment of the present invention.

FIG. 14 is a flowchart illustrating a method of obtaining mobile station information according to an embodiment of the present invention.

The method of FIG. 14 includes operations that are processed sequentially by the MN5 15 of FIG. 6, the MN5 15 of FIG. 8, the MN1 11 of FIG. 9, and the MN3 13 of FIG. 10. Thus, the descriptions of the MN5 15 of FIG. 6 will not be given again.

In operation 1401, the MN5 15 receives a wireless mesh network frame from other nodes over a wireless mesh network.

In operation 1402, the MN5 15 analyzes the received wireless mesh network frame.

In operation 1403, if the received wireless mesh network frame is one of a station information advertisement frame, a station information request frame, and a station information response frame, the MN5 15 obtains information about a mobile station located in a BSS coordinated by a mobile node that transmits the wireless mesh network frame using the wireless mesh network frame.

In operation 1404, if the received wireless mesh network frame is not one of a station information advertisement frame, a station information request frame, and a station information response frame, the MN5 15 processes the received wireless mesh network frame according to a policy prescribed for the wireless mesh network frame.

In operation 1405, the MN5 15 updates mobile station information stored in an ESS station table using the obtained information. In other words, the MN5 15 maps the MAC address of a mobile station obtained in operation 1404 to the MAC address of the MN5 15 of a forwarding table and adds the obtained MAC address of the mobile station to an ESS station table.

In operation 1406, the MN5 15 stores the MAC address of the mobile station added in operation 1404 and the MAC address of the MN5 15 of the forwarding table that are mapped to each other to indicate that the mobile station is located in the wireless LAN coordinated by the MN5 15.

Figure 15:
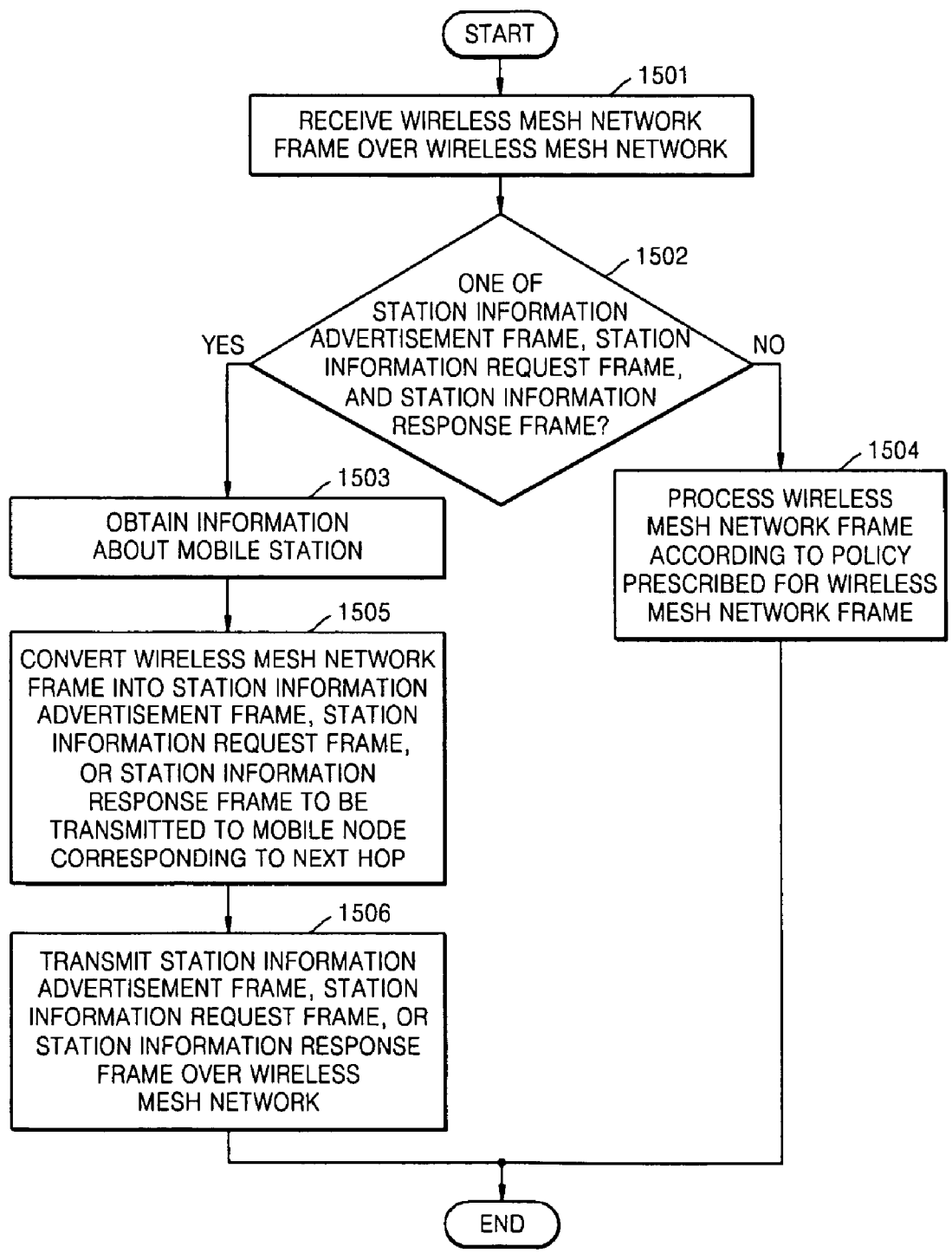
FIG. 15 is a flowchart illustrating a method of relaying mobile station information according to an embodiment of the present invention.

FIG. 15 is a flowchart illustrating a method of relaying mobile station information according to an embodiment of the present invention.

The method of FIG. 15 includes operations that are processed sequentially by the MN3 13 of FIG. 10. Thus, the description of the MN3 13 of FIG. 10 will not be given again.

In operation 1501, the MN3 13 receives a wireless mesh network frame from other mobile nodes over a wireless mesh network.

In operation 1502, the MN3 13 analyzes the received wireless mesh network frame.

In operation 1503, if the received wireless mesh network frame is one of a station information advertisement frame, a station information request frame, and a station information response frame, the MN3 13 obtains a information about a mobile station located in a BSS coordinated by a mobile node that transmits the wireless mesh network frame using the received wireless mesh network frame.

In operation 1504, if the received wireless mesh network frame is not one of the station information advertisement frame, the station information request frame, and the station information response frame, the MN3 13 processes the wireless mesh network frame according to a policy prescribed for the wireless mesh network frame.

In operation 1505, the MN3 13 converts the received station information advertisement frame, station information request frame, or station information response frame into a station information advertisement frame, a station information request frame, or a station information response frame, respectively, to be transmitted to a mobile node corresponding to a next hop by referring to next hop addresses of a forwarding table. The converted station information advertisement frame, station information request frame, or station information response frame includes the information obtained in operation 1503.

In operation 1506, the MN3 13 transmits the converted station information advertisement frame, station information request frame, or station information response frame over the wireless mesh network.

As described above, according to the present invention, a mechanism for establishing a wireless communication environment where a wireless mesh network and a wireless LAN are structured in a single plane and communicate with each other is suggested. To this end, a mechanism for distributing information about mobile stations included in a plurality of BSSs to wireless mesh points and wireless mesh APs is also proposed.

Moreover, various mechanisms for distributing mobile station information are provided based on traffic of the wireless communication environment and various transmission methods are suggested for efficient use of the bandwidth of a wireless communication channel and based on the reception rate of mobile station information.

Meanwhile, the methods of the present invention can be embodied as computer programs on recording media and executed on general-purpose digital computers. In addition, a data structure used in the present invention can be recorded on a computer-readable recording medium by various means.

Examples of the recording media include magnetic storage media such as read-only memory (ROM), floppy disks, and hard disks, optical data storage devices such as CD-ROMs and digital versatile discs (DVD), and carrier waves such as transmission over the Internet.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing mobile station information, the method comprising:
    obtaining information of at least one mobile station located in a wireless local area network (LAN) from among a plurality of wireless LANs using a first frame received through the wireless LAN; and
    transmitting a second frame comprising the obtained information over a wireless mesh network of mobile nodes comprising a mobile node that coordinates the wireless LAN.

2. The method of claim 1, wherein the information of the at least one mobile station comprises the address of the mobile station and the address of the mobile node to indicate that the mobile station is located in the wireless LAN coordinated by the mobile node.

3. The method of claim 1, wherein the transmitting of the second frame comprises periodically transmitting the second frame.

4. The method of claim 1, further comprising updating the information of the at least one mobile station located in the wireless LAN using the obtained information, wherein the transmitting of the second frame comprises transmitting the second frame if the information of the mobile station is changed by the update.

5. The method of claim 1, wherein the transmitting of the second frame comprises:
    transmitting the second frame if the first frame comprises data to be transmitted to a mobile station located in another wireless LAN; and
    obtaining information of the mobile station located in another wireless LAN using a third frame that is a response to the transmitted second frame.

6. The method of claim 1, further comprising analyzing traffic patterns of frames transmitted and received over the network of the mobile nodes, wherein the transmitting of the second frame comprises transmitting the second frame comprising information of all mobile stations located in the wireless LAN if the analysis result indicates that the survival time of traffic is shorter than a first threshold value and traffic is dispersed by a value that is greater than a second threshold value.

7. The method of claim 1, further comprising analyzing traffic patterns of frames transmitted and received over the network of the mobile nodes, wherein the transmitting of the second frame comprises transmitting the second frame comprising information of a mobile station related to traffic from among all mobile stations located in the wireless LAN if the analysis result indicates that a survival time of traffic is longer than a first threshold value and traffic is concentrated by a value that is greater than a second threshold value.

8. An apparatus providing mobile station information, the apparatus comprising:
    a first frame processing unit obtaining information of at least one mobile station located in a wireless local area network (LAN) from among a plurality of wireless LANs using a first frame received through the wireless LAN; and a second frame transmitting unit transmitting a second frame comprising the obtained information over a wireless mesh network of mobile nodes comprising a mobile node that coordinates the wireless LAN.

9. A non-transitory computer-readable recording medium having recorded thereon a program for implementing a method of providing mobile station information, the method comprising:

obtaining information of at least one mobile station located in a wireless local area network (LAN) from among a plurality of wireless LANs using a first frame received through the wireless LAN; and transmitting a second frame comprising the obtained information over a wireless mesh network of mobile nodes comprising a mobile node that coordinates the wireless LAN.

10. A method of obtaining mobile station information, the method comprising:

receiving a frame over a wireless mesh network of mobile nodes; and obtaining information of at least one mobile station located in a wireless local area network (LAN) coordinated by one of the mobile nodes using the received frame.

11. The method of claim 10, wherein the information of the at least one mobile station comprises the address of the mobile station and the address of the mobile node to indicate that the mobile station is located in the wireless LAN coordinated by the mobile node.

12. The method of claim 11, further comprising mapping the address of the mobile station to the address of the mobile node and storing the mapped addresses using the obtained information.

13. The method of claim 10, wherein the mobile nodes include mobiles nodes serving as both nodes in the network of the mobile nodes and access points (APs) that coordinate wireless LANs comprising the wireless LAN and mobile nodes serving only as nodes in the network of the mobile nodes.

14. An apparatus for obtaining mobile station information, the apparatus comprising:

a frame receiving unit receiving a frame over a wireless mesh network of mobile nodes; and a frame processing unit obtaining information of at least one mobile station located in a wireless local area network (LAN) coordinated by one of the mobile nodes using the frame received via the frame receiving unit.

15. The apparatus of claim 14, wherein the information of the mobile station includes a MAC address of the at least one mobile station and a MAC address of at least one of the mobile nodes.

16. The apparatus of claim 14, wherein if the frame received by the frame receiving unit is not related to authentication and association, the frame processing unit processes the frame according to a policy prescribed for wireless LAN frames.

17. The apparatus of claim 14, wherein if the frame processing unit fails to obtain a MAC address of a mobile node mapped to a MAC address of the at least one mobile station, the frame processing unit instructs a station information request frame generating unit to generate a station information request frame.

18. The apparatus of claim 17, wherein the station information request frame includes a type field, a broadcast address field, a destination station address field, a mesh AP address field, a source station address filed and other fields.

19. A non-transitory computer-readable recording medium having recorded thereon a program for implementing a method of obtaining mobile station information, the method comprising:

receiving a frame over a wireless mesh network of mobile nodes; and obtaining information of at least one mobile station located in a wireless local area network (LAN) coordinated by one of the mobile nodes using the received frame.

20. A method of relaying mobile station information, the method comprising:

obtaining information of at least one mobile station located in a wireless local area network (LAN) coordinated by one of a plurality of mobile nodes using a first frame received over a wireless mesh network of the mobile nodes; and transmitting a second frame comprising the obtained information over the network of the mobile nodes.

21. The method of claim 20, wherein the information of the at least one mobile station comprises an address of the mobile station and an address of the mobile node to indicate that the mobile station is located in the wireless LAN coordinated by the mobile node.

22. The method of claim 20, wherein the transmitting of the second frame comprises transmitting the second frame to a next hop determined according to a predetermined routing protocol.

23. The method of claim 20, wherein the obtaining of the information comprises obtaining the information by analyzing the first frame; and the transmitting of the second frame comprises transmitting the obtained information based on the analysis of the first frame.

24. An apparatus relaying mobile station information, the apparatus comprising:

a first frame processing unit obtaining information of at least one mobile station located in a wireless local area network (LAN) coordinated by one of a plurality of mobile nodes using a first frame received over a wireless mesh network of the mobile nodes; and a second frame transmitting unit transmitting a second frame comprising the obtained information over the network of the mobile nodes.

25. A non-transitory computer-readable recording medium having recorded thereon a program for implementing a method of relaying mobile station information, the method comprising:

obtaining information of at least one mobile station located in a wireless local area network (LAN) coordinated by one of a plurality of mobile nodes using a first frame received over a wireless mesh network of the mobile nodes; and transmitting a second frame comprising the obtained information over the network of the mobile nodes.

26. A method of distributing mobile station information over a wireless mesh network of mobile nodes, the method comprising:

receiving a wireless LAN frame through a basic service set (BSS);

analyzing the received wireless LAN frame;

determining whether the received wireless LAN frame is related to authentication and association with respect to the BSS; and if the received wireless LAN frame is related to authentication and association with respect to the BSS, obtaining information of a mobile station located in the BSS using the received wireless LAN frame, generating station information advertisement frame including a stored MAC address of the mobile station to indicate that the mobile station is located in the wireless mesh network of mobile nodes.

* * * * *